(12) United States Patent
Kadono

(10) Patent No.: US 12,437,639 B2
(45) Date of Patent: Oct. 7, 2025

(54) INFORMATION PROCESSING DEVICE, INFORMATION PROCESSING METHOD, AND INFORMATION PROCESSING PROGRAM

(71) Applicant: Sony Semiconductor Solutions Corporation, Kanagawa (JP)

(72) Inventor: Yuki Kadono, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/687,933

(22) PCT Filed: Oct. 3, 2022

(86) PCT No.: PCT/JP2022/036963
§ 371 (c)(1),
(2) Date: Feb. 29, 2024

(87) PCT Pub. No.: WO2023/063145
PCT Pub. Date: Apr. 20, 2023

(65) Prior Publication Data
US 2025/0131824 A1    Apr. 24, 2025

(30) Foreign Application Priority Data
Oct. 13, 2021    (JP) .................. 2021-167807

(51) Int. Cl.
*G08G 1/14*    (2006.01)
*B62D 15/02*    (2006.01)

(52) U.S. Cl.
CPC ............ *G08G 1/14* (2013.01); *B62D 15/027* (2013.01)

(58) Field of Classification Search
CPC ............................. G08G 1/14; B62D 15/027
See application file for complete search history.

(56) References Cited

U.S. PATENT DOCUMENTS 9,508,260 B2 * 11/2016 Shaik ................ G01C 21/3407
10,232,673 B1 * 3/2019 Lavoie ................ B60C 23/0479
(Continued)

FOREIGN PATENT DOCUMENTS

JP    2006160194 A    6/2006
JP    2015074255 A    4/2015
(Continued)

OTHER PUBLICATIONS

International Search Report (PCT/ISA/210), International Application No. PCT/JP2022/036963, dated Nov. 8, 2022.

*Primary Examiner* — Mohamed Barakat
(74) *Attorney, Agent, or Firm* — Michael Best & Friedrich LLP

(57) ABSTRACT

An information processing device according to the present disclosure includes an acquisition unit, a detection unit (74), and a determination unit (75). The acquisition unit acquires environmental information around a host vehicle (1). The detection unit (74) detects a vacant space (Rv) in an interest area (R) set around the host vehicle (1) on the basis of a positional relationship between a plurality of other vehicles (100) included in the environmental information. The determination unit (75) determines whether or not the host vehicle (1) can be parked in the vacant space (Rv) that has been detected.

9 Claims, 11 Drawing Sheets

(56) References Cited

U.S. PATENT DOCUMENTS

| | | | |
|---|---|---|---|
| 10,831,204 B1* | 11/2020 | Fields | B60W 30/06 |
| 2013/0060421 A1* | 3/2013 | Kadowaki | B62D 15/027 |
| | | | 701/36 |
| 2018/0208244 A1* | 7/2018 | Nakayama | B62D 15/0285 |
| 2018/0299884 A1* | 10/2018 | Morita | G08G 1/202 |
| 2019/0096141 A1* | 3/2019 | Banatwala | G06Q 10/00 |
| 2021/0114586 A1* | 4/2021 | Graefe | G08G 1/147 |

FOREIGN PATENT DOCUMENTS

| | | | |
|---|---|---|---|
| JP | 2016101778 A * | 6/2016 | |
| JP | 2016215691 A | 12/2016 | |
| JP | 2018063575 A * | 4/2018 | |
| WO | 2018225177 A1 | 12/2018 | |
| WO | 2020095672 A1 | 5/2020 | |
| WO | 2021044616 A1 | 3/2021 | |

* cited by examiner (a)

(b)

INFORMATION PROCESSING DEVICE, INFORMATION PROCESSING METHOD, AND INFORMATION PROCESSING PROGRAM

FIELD

The present disclosure relates to an information processing device, an information processing method, and an information processing program.

BACKGROUND

In recent years, with the development of autonomous driving technology, image processing devices that detect a parking frame for parking a vehicle from image data capturing the surroundings of the vehicle have become widespread. In this type of image processing devices, a partition line such as a white line that partitions a parking frame is detected from image data, and the parking frame is detected on the basis of the detected partition line (see, for example, Patent Literature 1).

CITATION LIST

Patent Literature

Patent Literature 1: JP 2015-74255 A

SUMMARY

Technical Problem

The present disclosure proposes an information processing device, an information processing method, and an information processing program capable of suggesting a parking frame to a driver or the like even in a case where there is no information of partition lines.

Solution to Problem

According to the present disclosure, there is provided an information processing device. The information processing device includes an acquisition unit, a detection unit, and a determination unit. The acquisition unit acquires environmental information around a host vehicle. The detection unit detects a vacant space in an interest area set around the host vehicle on the basis of a positional relationship between a plurality of other vehicles included in the environmental information. The determination unit determines whether or not the host vehicle can be parked in the vacant space that has been detected.

DESCRIPTION OF EMBODIMENTS

Figure 1:
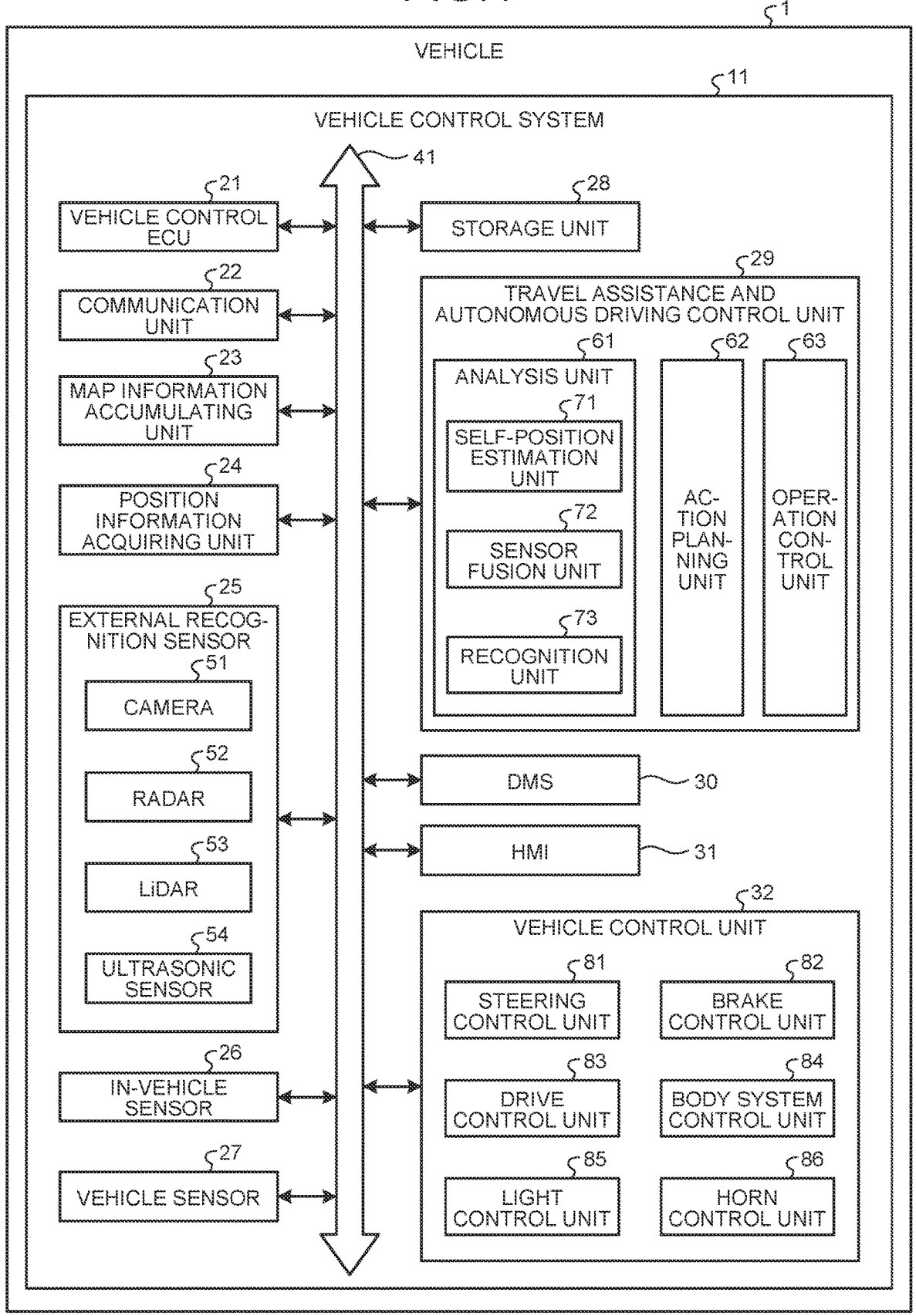
FIG. 1 is a block diagram illustrating a configuration example of a vehicle control system according to an embodiment of the present disclosure.

Hereinafter, embodiments of the present disclosure will be described by referring to the drawings. Note that the present disclosure is not limited by the embodiments described below. In addition, the embodiments can be combined as appropriate as long as there is no contradiction in the processing content. In the following embodiments, the same components are denoted by the same reference numerals, and redundant description will be omitted.

In the embodiment described below, expressions such as "constant", "orthogonal", "vertical", and "parallel" may be used, but these expressions do not need to mean to be strictly "constant", "orthogonal", "vertical", and "parallel", respectively. That is, it is based on the premise that each of the expressions listed above allows, for example, deviation in the measurement accuracy, the installation accuracy, and the like.

In recent years, with the development of autonomous driving technology, image processing devices that detect a parking frame for parking a vehicle from image data capturing the surroundings of the vehicle have become widespread. In this type of image processing devices, a partition line such as a white line that partitions a parking frame is detected from image data, and the parking frame is detected on the basis of the detected partition line.

Meanwhile, in the above-described conventional technology, in a case where no information of partition lines can be acquired (for example, partition lines have disappeared due to aging or the like), it is quite difficult to detect a parking frame, and thus it is very difficult to suggest a parking frame to the driver or the like.

Therefore, it is expected to overcome the above-described problems and to implement technology capable of suggesting a parking frame to a driver or the like even in a case where there is no information of partition lines.

<Configuration Example of Vehicle Control System>

FIG. 1 is a block diagram illustrating a configuration example of a vehicle control system 11 as an example of a traveling device control system to which the present technology is applied.

The vehicle control system 11 is included in a vehicle 1 and performs processing related to travel assistance and autonomous driving of the vehicle 1.

The vehicle control system 11 includes a vehicle control electronic control unit (ECU) 21, a communication unit 22, a map information accumulating unit 23, a position information acquiring unit 24, an external recognition sensor 25, an in-vehicle sensor 26, a vehicle sensor 27, a storage unit 28, a travel assistance and autonomous driving control unit 29, a driver monitoring system (DMS) 30, a human machine interface (HMI) 31, and a vehicle control unit 32.

The vehicle control ECU 21, the communication unit 22, the map information accumulating unit 23, the position information acquiring unit 24, the external recognition sensor 25, the in-vehicle sensor 26, the vehicle sensor 27, the storage unit 28, the travel assistance and autonomous driving control unit 29, the driver monitoring system (DMS) 30, the human-machine interface (HMI) 31, and the vehicle control unit 32 are communicably connected to each other via a communication network 41. The communication network 41 includes, for example, an in-vehicle communication network conforming to digital bilateral communication standards, such as a controller area network (CAN), a local interconnect network (LIN), a local area network (LAN), FlexRay (registered trademark), or Ethernet (registered trademark), a bus, or the like. The communication network 41 may be selectively used depending on the type of data to be transmitted. For example, a CAN may be applied to data related to vehicle control, and Ethernet may be applied to large-capacity data. Note that each unit of the vehicle control system 11 may be directly connected, not via the communication network 41, but by using wireless communication based on the premise of communication at a relatively short distance, such as near field communication (NFC) or Bluetooth (registered trademark).

Note that, hereinafter, in a case where each unit of the vehicle control system 11 performs communication via the communication network 41, description of the communication network 41 will be omitted. For example, in a case where the vehicle control ECU 21 and the communication unit 22 perform communication via the communication network 41, it is simply described that the vehicle control ECU 21 and the communication unit 22 perform communication.

The vehicle control ECU 21 includes, for example, various processors such as a central processing unit (CPU) or a micro processing unit (MPU). The vehicle control ECU 21 controls all or some of functions of the vehicle control System 11.

The communication unit 22 communicates with various devices inside and outside the vehicle, other vehicles, servers, base stations, and the like and transmits and receives various types of data. At this point, the communication unit 22 can perform communication using a plurality of communication schemes.

Communication that the communication unit 22 can execute with the outside of the vehicle will be schematically described. The communication unit 22 communicates with a server (hereinafter, referred to as an external server) or the like on an external network via a base station or an access point by a wireless communication scheme such as the 5th generation mobile communication system (5G), long term evolution (LTE), or dedicated short range communications (DSRC). The external network with which the communication unit 22 communicates is, for example, the Internet, a cloud network, a network unique to a company, or the like. The communication scheme performed by the communication unit 22 with the external network is not particularly limited as long as it is a wireless communication scheme capable of performing digital bidirectional communication at a communication speed equal to or higher than a predetermined speed and at a distance equal to or longer than a predetermined distance.

Furthermore, for example, the communication unit 22 can communicate with a terminal present in the vicinity of a host vehicle using the peer to peer (P2P) technology. The terminal present in the vicinity of the host vehicle is, for example, a terminal worn by a traveling body traveling at a relatively low speed such as a pedestrian or a bicycle, a terminal installed in a store or the like with a position fixed, or a machine type communication (MTC) terminal. Furthermore, the communication unit 22 can also perform V2X communication. The V2X communication refers to communication between the host vehicle and another party, such as vehicle to vehicle communication with another vehicle, vehicle to infrastructure communication with a roadside device or the like, vehicle to home communication with a house, and vehicle to pedestrian communication with a terminal or the like carried by a pedestrian.

The communication unit 22 can receive, for example, a program for updating software for controlling the operation of the vehicle control system 11 from the outside (Over-the-Air). The communication unit 22 can further receive map information, traffic information, information of the surroundings of the vehicle 1, and others from the outside. Furthermore, for example, the communication unit 22 can transmit information regarding the vehicle 1, information of the surroundings of the vehicle 1, and others to the outside. Examples of the information of the vehicle 1 transmitted to the outside by the communication unit 22 include data indicating the state of the vehicle 1, a recognition result by a recognition unit 73, and others. Furthermore, for example, the communication unit 22 performs communication conforming to a vehicle emergency call system such as the eCall.

For example, the communication unit 22 receives an electromagnetic wave transmitted by the vehicle information and communication system (VICS) (registered trademark) such as a radio wave beacon, an optical beacon, or FM multiplex broadcasting.

Communication that the communication unit 22 can execute with the inside of the vehicle will be schematically described. The communication unit 22 can communicate with each device in the vehicle using, for example, wireless communication. The communication unit 22 can perform wireless communication with an in-vehicle device by a communication scheme capable of performing digital bidirectional communication at a communication speed equal to or higher than a predetermined speed by wireless communication, such as wireless LAN, Bluetooth, NFC, or wireless USB (WUSB). Without being limited to the above, and the communication unit 22 can also communicate with each device in the vehicle using wired communication. For example, the communication unit 22 can communicate with each device in the vehicle by wired communication via a cable connected to a connection terminal (not illustrated). The communication unit 22 can communicate with each device in the vehicle by a communication scheme capable of performing digital bidirectional communication at a predetermined communication speed or higher by wired communication, such as the universal serial bus (USB), high-definition multimedia interface (HDMI) (registered trademark), or mobile high-definition link (MHL).

Here, a device in the vehicle refers to, for example, a device that is not connected to the communication network 41 in the vehicle. As examples of the device in the vehicle, a mobile device or a wearable device carried by a passenger such as a driver, an information device brought into the vehicle and temporarily installed, or the like are conceivable.

The map information accumulating unit 23 accumulates one or both of a map acquired from the outside and a map created in the vehicle 1. For example, the map information accumulating unit 23 accumulates three-dimensional high-precision maps, a global map having lower accuracy than the high-precision maps but covering a wide area, and others.

The high-precision maps are, for example, dynamic maps, point cloud maps, vector maps, or others. The dynamic map is, for example, a map including four layers of dynamic information, semi-dynamic information, semi-static information, and static information and is provided to the vehicle 1 from an external server or the like. The point cloud map is a map including point clouds (point cloud data). The vector map is, for example, a map in which traffic information such as lanes and positions of traffic lights are associated with a point cloud map and adapted to an advanced driver assistance system (ADAS) or autonomous driving (AD).

The point cloud map and the vector map may be provided from, for example, an external server or the like or may be created in the vehicle 1 as a map for performing matching with a local map to be described later on the basis of a sensing result by a camera 51, a radar 52, LiDAR 53, or the like and accumulated in the map information accumulating unit 23. In addition, in a case where a high-precision map is provided from an external server or the like, for example, map data of several hundred meters square regarding a planned path on which the vehicle 1 travels from now is acquired from an external server or the like in order to reduce the communication capacity.

The position information acquiring unit 24 receives global navigation satellite system (GNSS) signals from GNSS satellites and acquires position information of the vehicle 1. The acquired position information is supplied to the travel assistance and autonomous driving control unit 29. Note that the position information acquiring unit 24 is not limited to the method using the GNSS signals and may acquire the position information using, for example, a beacon.

The external recognition sensor 25 includes various sensors used for recognition of a situation outside the vehicle 1 and supplies sensor data from each of the sensors to units in the vehicle control system 11. Any type and any number of sensors may be included in the external recognition sensor 25.

For example, the external recognition sensor 25 includes the camera 51, the radar 52, the light detection and ranging or laser imaging detection and ranging (LiDAR) 53, and an ultrasonic sensor 54. Without being limited to the above, the external recognition sensor 25 may include one or more types of sensors among the camera 51, the radar 52, the LiDAR 53, and the ultrasonic sensor 54. The numbers of the cameras 51, the radars 52, the LiDARs 53, and the ultrasonic sensors 54 are not particularly limited as long as they can be practically installed in the vehicle 1. Furthermore, the type of sensor included in the external recognition sensor 25 is not limited to this example, and the external recognition sensor 25 may include another type of sensor. Examples of the sensing area of each sensor included in the external recognition sensor 25 will be described later.

Note that the imaging method of the camera 51 is not particularly limited. For example, cameras of various imaging methods such as a time-of-flight (ToF) camera using an imaging method capable of ranging, stereo cameras, a monocular camera, and an infrared camera can be applied to the camera 51 as necessary. Without being limited to the above, the camera 51 may simply acquire a captured image regardless of ranging.

Furthermore, for example, the external recognition sensor 25 can include an environment sensor for detecting the environment for the vehicle 1. The environment sensor is a sensor for detecting an environment such as the weather, the climate, or the brightness and can include various sensors such as a raindrop sensor, a fog sensor, a sunshine sensor, a snow sensor, and an illuminance sensor.

Furthermore, for example, the external recognition sensor 25 includes a microphone used for detection of sound around the vehicle 1, the position of a sound source, and others.

The in-vehicle sensor 26 includes various sensors for detecting information inside the vehicle and supplies sensor data from each sensor to each unit of the vehicle control system 11. The type and the number of various sensors included in the in-vehicle sensor 26 are not particularly limited as long as they can be practically installed in the vehicle 1.

For example, the in-vehicle sensor 26 can include one or more types of sensors of a camera, a radar, a seating sensor, a steering wheel sensor, a microphone, and a biological sensor. As the camera included in the in-vehicle sensor 26, for example, cameras of various imaging methods capable of ranging, such as a ToF camera, a stereo camera, a monocular camera, and an infrared camera, can be used. Without being limited to the above, the camera included in the in-vehicle sensor 26 may simply acquire a captured image regardless of ranging. The biological sensor included in the in-vehicle sensor 26 is included, for example, on a seat, a steering wheel, or the like and detects various types of biological information of a passenger such as the driver.

The vehicle sensor 27 includes various sensors for detecting the state of the vehicle 1 and supplies sensor data from each sensor to each unit of the vehicle control system 11. The type and the number of various sensors included in the vehicle sensor 27 are not particularly limited as long as they can be practically installed in the vehicle 1.

For example, the vehicle sensor 27 includes a speed sensor, an acceleration sensor, an angular velocity sensor (gyro sensor), and an inertial measurement unit (IMU) integrating these sensors. For example, the vehicle sensor 27 includes a steering angle sensor that detects the steering angle of the steering wheel, a yaw rate sensor, an accelerator sensor that detects an operation amount of an accelerator pedal, and a brake sensor that detects an operation amount of a brake pedal. For example, the vehicle sensor 27 includes a rotation sensor that detects the number of revolutions of the engine or the motor, an air pressure sensor that detects the air pressure of the tires, a slip ratio sensor that detects the slip ratio of the tires, and a wheel speed sensor that detects the rotational speed of the wheels. For example, the vehicle sensor 27 includes a battery sensor that detects a remaining amount and the temperature of a battery and an impact sensor that detects an impact from the outside.

The storage unit 28 includes at least one of a nonvolatile storage medium or a volatile storage medium and stores data or a program. The storage unit 28 is used as, for example, an electrically erasable programmable read-only memory (EEPROM) and a random access memory (RAM), and a magnetic storage device such as a hard disc drive (HDD), a semiconductor storage device, an optical storage device, and a magneto-optical storage device can be applied as the storage medium. The storage unit 28 stores various programs and data used by each unit of the vehicle control system 11. For example, the storage unit 28 includes an event data recorder (EDR) and a data storage system for automated driving (DSSAD) and stores information of the vehicle 1 before and after an event such as an accident and information acquired by the in-vehicle sensor 26.

The travel assistance and autonomous driving control unit 29 is an example of the information processing device and controls travel assistance and autonomous driving of the vehicle 1. For example, the travel assistance and autonomous driving control unit 29 includes an analysis unit 61, an action planning unit 62, and an operation control unit 63.

The analysis unit 61 performs analysis processing of the situation of the vehicle 1 and the surroundings. The analysis unit 61 includes a self-position estimation unit 71, a sensor fusion unit 72, and the recognition unit 73. Furthermore, the analysis unit 61 according to the embodiment further includes a detection unit 74 (see FIG. 3) and a determination unit 75 (see FIG. 3).

The self-position estimation unit 71 estimates the self-position of the vehicle 1 on the basis of the sensor data from the external recognition sensor 25 and the high-precision maps accumulated in the map information accumulating unit 23. For example, the self-position estimation unit 71 generates a local map on the basis of the sensor data from the external recognition sensor 25 and estimates the self-position of the vehicle 1 by matching the local map with the high-precision maps. The position of the vehicle 1 is based on, for example, the center of the axle of the pair of rear wheels.

The local map is, for example, a three-dimensional high-precision map created using technology such as simultaneous localization and mapping (SLAM), an occupancy grid map, or the like. The three-dimensional high-precision map is, for example, the above-described point cloud map or the like. The occupancy grid map is a map in which a three-dimensional or two-dimensional space around the vehicle 1 is divided into grids of a predetermined size, and an occupancy state of an object is indicated for every grid. The occupancy state of the object is indicated by, for example, the presence or absence or the presence probability of the object. The local map is also used for detection processing and recognition processing of a situation outside the vehicle 1 by the recognition unit 73, for example.

Note that the self-position estimation unit 71 may estimate the self-position of the vehicle 1 on the basis of the position information acquired by the position information acquiring unit 24 and the sensor data from the vehicle sensor 27.

The sensor fusion unit 72 performs sensor fusion processing of combining a plurality of different types of sensor data (for example, image data supplied from the camera 51 and sensor data supplied from the radar 52) to obtain new information. Methods for combining different types of sensor data include integration, fusion, association, and the like.

The recognition unit 73 is an example of an acquisition unit and executes detection processing for detecting a situation outside the vehicle 1 and recognition processing for recognizing a situation outside the vehicle 1.

For example, the recognition unit 73 performs detection processing and recognition processing of a situation outside the vehicle 1 on the basis of information from the external recognition sensor 25, information from the self-position estimation unit 71, information from the sensor fusion unit 72, and others.

Specifically, for example, the recognition unit 73 performs detection processing, recognition processing, and the like of an object around the vehicle 1. The detection processing of an object is, for example, processing of detecting the presence or absence, the size, the shape, the position, the motion, and the like of the object. The recognition processing of an object is, for example, processing of recognizing an attribute such as the type of the object or identifying a specific object. However, the detection processing and the recognition processing are not necessarily clearly divided and may overlap with each other.

For example, the recognition unit 73 detects an object around the vehicle 1 by performing clustering of classifying point clouds based on sensor data by the radar 52, the LiDAR 53, or the like into groups of point clouds. As a result, the presence or absence, the size, the shape, and the position of an object around the vehicle 1 are detected.

For example, the recognition unit 73 detects the motion of an object around the vehicle 1 by performing tracking of following the motion of a group of a point cloud classified by the clustering. As a result, the speed and the traveling direction (travel vector) of the object around the vehicle 1 are detected.

For example, the recognition unit 73 detects or recognizes a vehicle, a person, a bicycle, an obstacle, a structure, a road, a traffic light, a traffic sign, road marking, and the like on the basis of image data supplied from the camera 51. Furthermore, the recognition unit 73 may recognize the type of the object around the vehicle 1 by performing recognition processing such as semantic segmentation.

For example, the recognition unit 73 can perform recognition processing of traffic rules around the vehicle 1 on the basis of the maps accumulated in the map information accumulating unit 23, an estimation result of the self-position by the self-position estimation unit 71, and a recognition result of an object around the vehicle 1 by the recognition unit 73. Through this processing, the recognition unit 73 can recognize the position and the state of the traffic light, the content of the traffic sign and the road marking, the content of the traffic regulations, travelable lanes, and the like.

For example, the recognition unit 73 can perform the recognition processing of the environment around the vehicle 1. As the surrounding environment to be recognized by the recognition unit 73, the weather, the temperature, the humidity, the brightness, the state of a road surface, and the like are conceivable.

Details of the analysis unit 61 according to the embodiment, including the detection unit 74 and the determination unit 75 not illustrated in FIG. 1, will be described later.

The action planning unit 62 creates an action plan of the vehicle 1. For example, the action planning unit 62 creates an action plan by performing processing of global path planning and path tracking.

Note that the global path planning is processing of planning a rough path from the start to the goal. This global path planning also includes processing, referred to as path planning, of performing local path planning that enables safe and smooth traveling in the vicinity of the vehicle 1 in consideration of the motion characteristics of the vehicle 1 on the planned path.

The path tracking is processing of planning an operation for safely and accurately traveling on the path planned by the global path planning within a planned time. For example, the action planning unit 62 can calculate a target speed and a target angular velocity of the vehicle 1 on the basis of the result of the path tracking processing.

The operation control unit 63 controls the operation of the vehicle 1 in order to implement the action plan created by the action planning unit 62.

For example, the operation control unit 63 controls a steering control unit 81, a brake control unit 82, and a drive control unit 83 included in the vehicle control unit 32, to be described later, to perform acceleration and deceleration control and direction control in such a manner that the vehicle 1 travels on the path calculated by the path planning. For example, the operation control unit 63 performs cooperative control for the purpose of implementing the functions of the ADAS such as collision avoidance or impact mitigation, follow-up traveling, vehicle speed maintaining traveling, collision warning for the host vehicle, lane deviation warning for the host vehicle, and the like. The operation control unit 63 performs, for example, cooperative control intended for autonomous driving or the like in which the vehicle travels autonomously without depending on the operation of the driver.

The DMS 30 performs authentication processing of the driver, recognition processing of the state of the driver, and the like on the basis of sensor data from the in-vehicle sensor 26, input data input to the HMI 31 to be described later, and others. As the state of the driver to be recognized, for example, the physical condition, the arousal level, the concentration level, the fatigue level, the line-of-sight direction, the drunkenness level, a driving operation, the posture, and the like are conceivable.

Note that the DMS 30 may perform authentication processing of a passenger other than the driver and recognition processing of the state of the passenger. Furthermore, for example, the DMS 30 may perform recognition processing of the situation inside the vehicle on the basis of sensor data from the in-vehicle sensor 26. As the situation inside the vehicle to be recognized, for example, the temperature, the humidity, the brightness, the odor or the sent, and the like are conceivable.

The HMI 31 inputs various types of data, instructions, and the like and presents the various types of data to the driver and others.

Data input by the HMI 31 will be schematically described. The HMI 31 includes an input device for a person to input data. The HMI 31 generates an input signal on the basis of data, an instruction, or the like input by the input device and supplies the input signal to each unit of the vehicle control system 11. The HMI 31 includes an operator such as a touch panel, a button, a switch, or a lever as the input device. Without being limited to the above, the HMI 31 may further include an input device capable of inputting information by a method other than manual operation such as by voice, a gesture, or others. Furthermore, the HMI 31 may use, for example, a remote control device using infrared rays or radio waves or an external connection device such as a mobile device or a wearable device supporting the operation of the vehicle control system 11 as an input device.

Presentation of data by the HMI 31 will be schematically described. The HMI 31 generates visual information, auditory information, and tactile information for the passengers or the outside of the vehicle. In addition, the HMI 31 performs output control for controlling output, output content, output timing, an output method, and others of each piece of information that is generated. The HMI 31 generates and outputs, as the visual information, information indicated by images or light such as an operation screen, state display of the vehicle 1, warning display, or a monitor image indicating a situation around the vehicle 1. Furthermore, the HMI 31 generates and outputs information indicated by sounds such as a voice guidance, a warning sound, or a warning message as the auditory information. Furthermore, the HMI 31 generates and outputs, as the tactile information, information given to the tactile sense of the passengers by, for example, a force, vibrations, a motion, or the like.

As an output device with which the HMI 31 outputs the visual information, for example, a display device that presents the visual information by displaying an image thereon or a projector device that presents the visual information by projecting an image are applicable. Note that the display device may be a device that displays the visual information in the field of view of the passengers such as a head-up display, a transmissive display, or a wearable device having an augmented reality (AR) function other than a display device having a normal display. In addition, the HMI 31 can use display devices included in a navigation device, an instrument panel, a camera monitoring system (CMS), an electronic mirror, a lamp, or the like included in the vehicle 1 as an output device that outputs the visual information.

As an output device from which the HMI 31 outputs the auditory information, for example, an audio speaker, headphones, or earphones are applicable.

As an output device to which the HMI 31 outputs the tactile information, for example, a haptics element using haptic technology is applicable. The haptics element is provided, for example, at a portion with which a passenger of the vehicle 1 comes into contact, such as a steering wheel or a seat.

The vehicle control unit 32 controls each unit of the vehicle 1. The vehicle control unit 32 includes the steering control unit 81, the brake control unit 82, the drive control unit 83, a body system control unit 84, a light control unit 85, and a horn control unit 86.

The steering control unit 81 detects and controls the state of the steering system of the vehicle 1. The steering system includes, for example, a steering mechanism including a steering wheel and the like, an electric power steering, and the like. The steering control unit 81 includes, for example, a steering ECU that controls the steering system, an actuator that drives the steering system, and others.

The brake control unit 82 detects and controls the state of the brake system of the vehicle 1. The brake system includes, for example, a brake mechanism including a brake pedal, an antilock brake system (ABS), a regenerative brake mechanism, and the like. The brake control unit 82 includes, for example, a brake ECU that controls the brake system, an actuator that drives the brake system, and the like.

The drive control unit 83 detects and controls the state of a drive system of the vehicle 1. The drive system includes, for example, a driving force generation device for generating a driving force such as an accelerator pedal, an internal combustion engine, and a driving motor, a driving force transmission mechanism for transmitting the driving force to wheels, and others. The drive control unit 83 includes, for example, a drive ECU that controls the drive system, actuators that drive the drive system, and others.

The body system control unit 84 detects and controls the state of a body system of the vehicle 1. The body system includes, for example, a keyless entry system, a smart key system, a power window device, a power seat, an air conditioner, an airbag, a seat belt, a shift lever, and others. The body system control unit 84 includes, for example, a body system ECU that controls the body system, actuators that drive the body system, and others.

The light control unit 85 detects and controls states of various lights of the vehicle 1. As the lights to be controlled, for example, a headlight, a backlight, a fog light, a turn signal, a brake light, projection, display on a bumper, and the like are conceivable. The light control unit 85 includes a light ECU that controls the lights, actuators that drive the lights, and the like.

The horn control unit 86 detects and controls the state of a car horn of the vehicle 1. The horn control unit 86 includes, for example, a horn ECU that controls the car horn, an actuator that drives the car horn, and the like.

Figure 2:
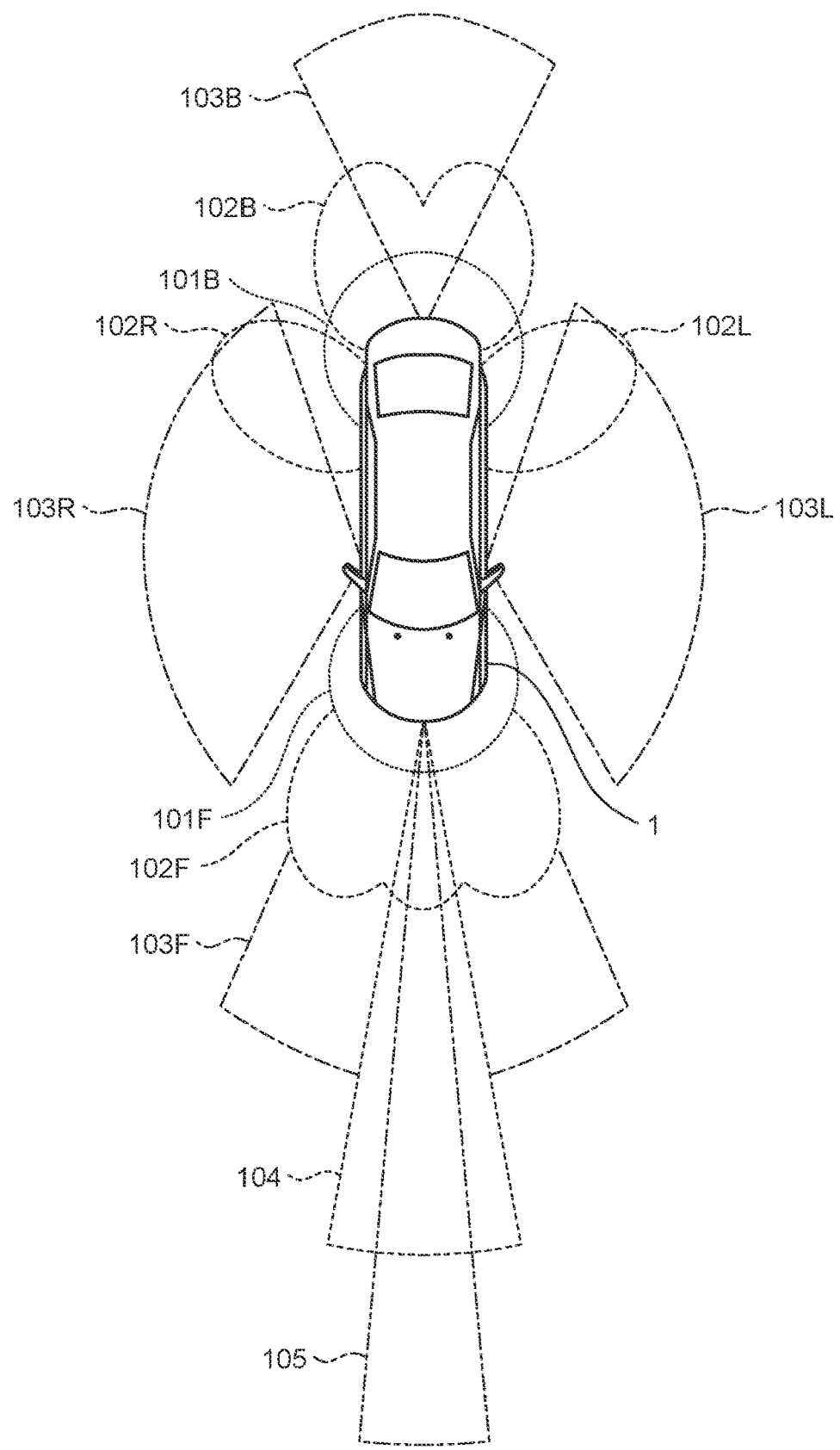
FIG. 2 is a diagram illustrating an example of sensing areas according to the embodiment of the disclosure.

FIG. 2 is a diagram illustrating an example of sensing areas by the camera 51, the radar 52, the LiDAR 53, the ultrasonic sensor 54, or others of the external recognition sensor 25 in FIG. 1. Note that FIG. 2 schematically illustrates the vehicle 1 as viewed from above, in which the left end side is the front end (front) side of the vehicle 1, and the right end side is the rear end (rear) side of the vehicle 1.

A sensing area 101F and a sensing area 101B indicate examples of sensing areas of ultrasonic sensors 54. The sensing area 101F covers the periphery of the front end of the vehicle 1 by a plurality of ultrasonic sensors 54. The sensing area 101B covers the periphery of the rear end of the vehicle 1 by a plurality of ultrasonic sensors 54.

Sensing results in the sensing area 101F and the sensing area 101B are used for, for example, parking assistance of the vehicle 1.

A sensing area 102F or a sensing area 102B indicates an example of a sensing area of the radar 52 for a short distance or a middle distance. The sensing area 102F covers up to a position farther than the sensing area 101F ahead of the vehicle 1. The sensing area 102B covers up to a position farther than the sensing area 101B behind the vehicle 1. A sensing area 102L covers the rear periphery of the left side face of the vehicle 1. A sensing area 102R covers the rear periphery of the right side face of the vehicle 1.

A sensing result in the sensing area 102F is used, for example, to detect a vehicle, a pedestrian, or the like present ahead of the vehicle 1. A sensing result in the sensing area 102B is used for, for example, a collision prevention function or the like behind the vehicle 1. Sensing results in the sensing area 102L and the sensing area 102R are used for, for example, detecting an object in a blind spot on the sides of the vehicle 1.

A sensing area 103F or a sensing area 103B indicates an example of a sensing area by the camera 51. The sensing area 103F covers up to a position farther than the sensing area 102F ahead of the vehicle 1. The sensing area 103B covers up to a position farther than the sensing area 102B behind the vehicle 1. A sensing area 103L covers the periphery of the left side face of the vehicle 1. A sensing area 103R covers the periphery of the right side face of the vehicle 1.

A sensing result in the sensing area 103F can be used for, for example, recognition of a traffic light or a traffic sign, a lane deviation prevention assist system, and an automatic headlight control system. A sensing result in the sensing area 103B can be used for, for example, parking assistance and a surround view system. Sensing results in the sensing area 103L and the sensing area 103R can be used for the surround view system, for example.

A sensing area 104 indicates an example of a sensing area of the LiDAR 53. The sensing area 104 covers up to a position farther than the sensing area 103F ahead of the vehicle 1. Meanwhile, the sensing area 104 has a narrower area in the left-right direction than that of the sensing area 103F.

A sensing result in the sensing area 104 is used for, for example, detecting an object such as a surrounding vehicle.

A sensing area 105 indicates an example of a sensing area of the radar 52 for a long distance. The sensing area 105 covers up to a position farther than the sensing area 104 ahead of the vehicle 1. Meanwhile, the sensing area 105 has a narrower area in the left-right direction than that of the sensing area 104.

A sensing result in the sensing area 105 is used for, for example, adaptive cruise control (ACC), emergency braking, collision avoidance, and the like.

Note that the sensing areas of the sensors of the camera 51, the radar 52, the LiDAR 53, and the ultrasonic sensor 54 included in the external recognition sensor 25 may have various configurations other than those in FIG. 2. Specifically, the ultrasonic sensor 54 may also perform sensing on the sides of the vehicle 1, or the LiDAR 53 may perform sensing behind the vehicle 1. In addition, the installation positions of the sensors are not limited to the examples described above. Furthermore, the number of the sensors may be one or plural.

<Details of Control Processing>

Figure 3:
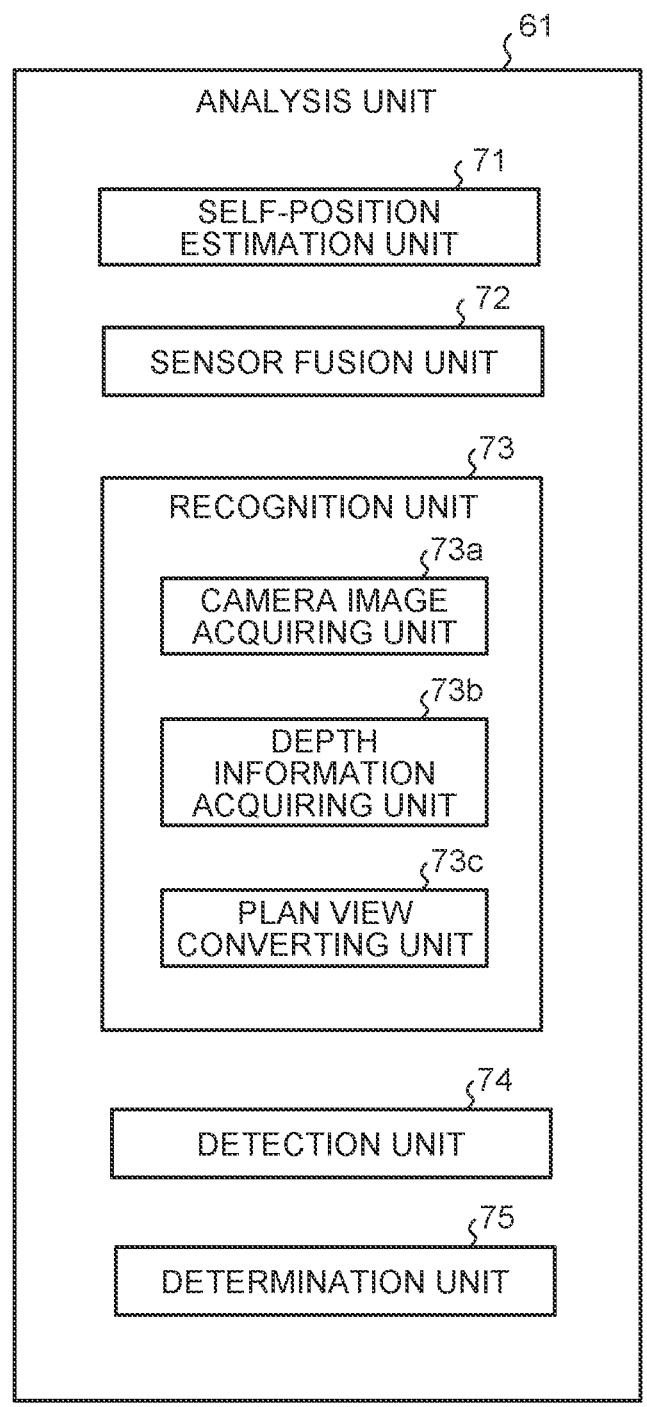
FIG. 3 is a block diagram illustrating a configuration example of an analysis unit according to the embodiment of the disclosure.

Next, details of control processing according to the embodiment will be described with reference to FIGS. 3 to 9. FIG. 3 is a block diagram illustrating a configuration example of the analysis unit 61 according to the embodiment of the disclosure.

As illustrated in FIG. 3, the analysis unit 61 includes the self-position estimation unit 71, the sensor fusion unit 72, the recognition unit 73, the detection unit 74, and the determination unit 75 and implements or executes functions or actions of control processing described below. Note that the internal configuration of the analysis unit 61 is not limited to the configuration illustrated in FIG. 3 and may be another configuration as long as control processing described below is performed.

The self-position estimation unit 71 estimates the self-position of the vehicle 1 on the basis of the sensor data from the external recognition sensor 25 (see FIG. 1) and the high-precision maps accumulated in the map information accumulating unit 23 (see FIG. 1). The sensor fusion unit 72 performs sensor fusion processing of combining a plurality of different types of sensor data to obtain new information.

The recognition unit 73 executes detection processing for detecting a situation outside the vehicle 1 and recognition processing for recognizing a situation outside the vehicle 1. The recognition unit 73 according to the embodiment includes a camera image acquiring unit 73*a*, a depth information acquiring unit 73*b*, and a plan view converting unit 73*c*.

Figure 4:
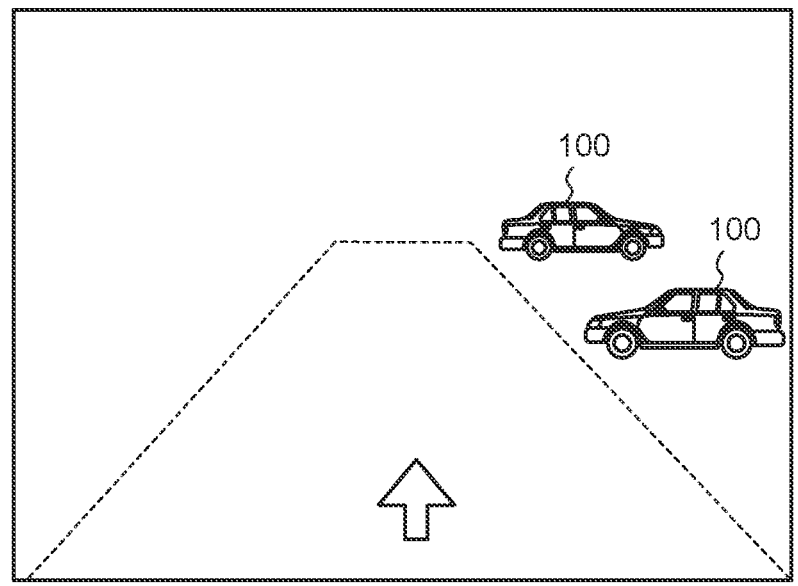
FIG. 4 is a diagram for describing an example of processing executed by a recognition unit according to the embodiment of the disclosure.
Figure 4:
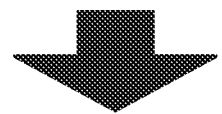
Figure 4:
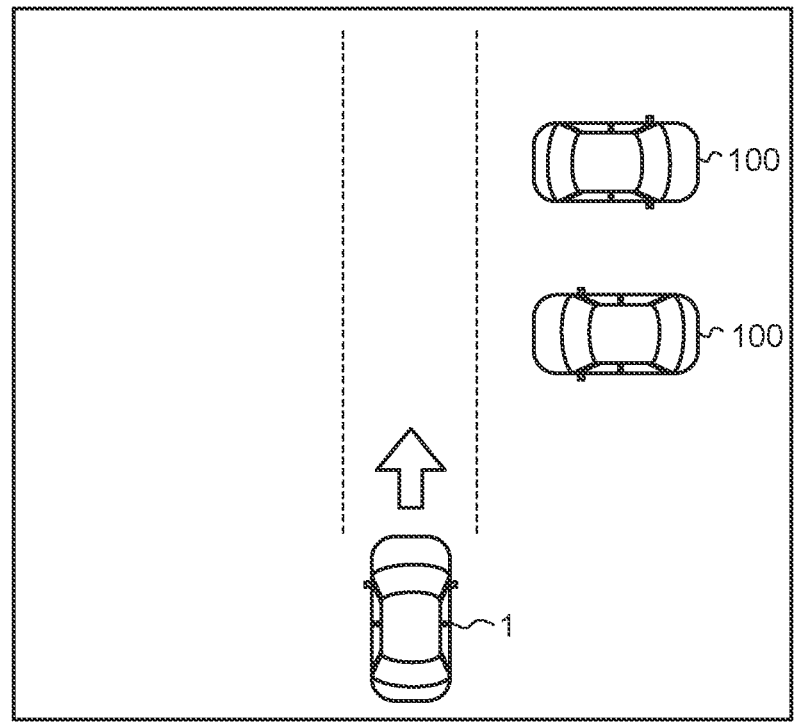

The camera image acquiring unit 73a acquires a camera image captured by the camera 51 (see FIG. 1). For example, as illustrated in (a) of FIG. 4, the camera image acquiring unit 73a acquires a camera image in which a situation ahead of the vehicle 1 is captured. FIG. 4 is a diagram for describing an example of processing executed by the recognition unit 73 according to the embodiment of the disclosure.

The depth information acquiring unit 73b acquires depth information of an object located ahead of the vehicle 1. The depth information acquiring unit 73b acquires depth information of an object located ahead of the vehicle 1 on the basis of, for example, measurement data acquired by the LIDAR 53 (see FIG. 1).

For example, as illustrated in (a) of FIG. 4, each piece of depth information of a plurality of (two in the drawing) other vehicles 100 located ahead of the vehicle 1 is acquired. Note that, in the present disclosure, the vehicle 1 is also referred to as the "host vehicle 1" in order to facilitate distinction from the other vehicles 100.

The plan view converting unit 73c converts the camera image acquired by the camera image acquiring unit 73a into a plan view using the depth information of the object acquired by the depth information acquiring unit 73b. For example, the plan view converting unit 73c converts the camera image as illustrated in (a) of FIG. 4 into a plan view as illustrated in (b) of FIG. 4.

Figure 5:
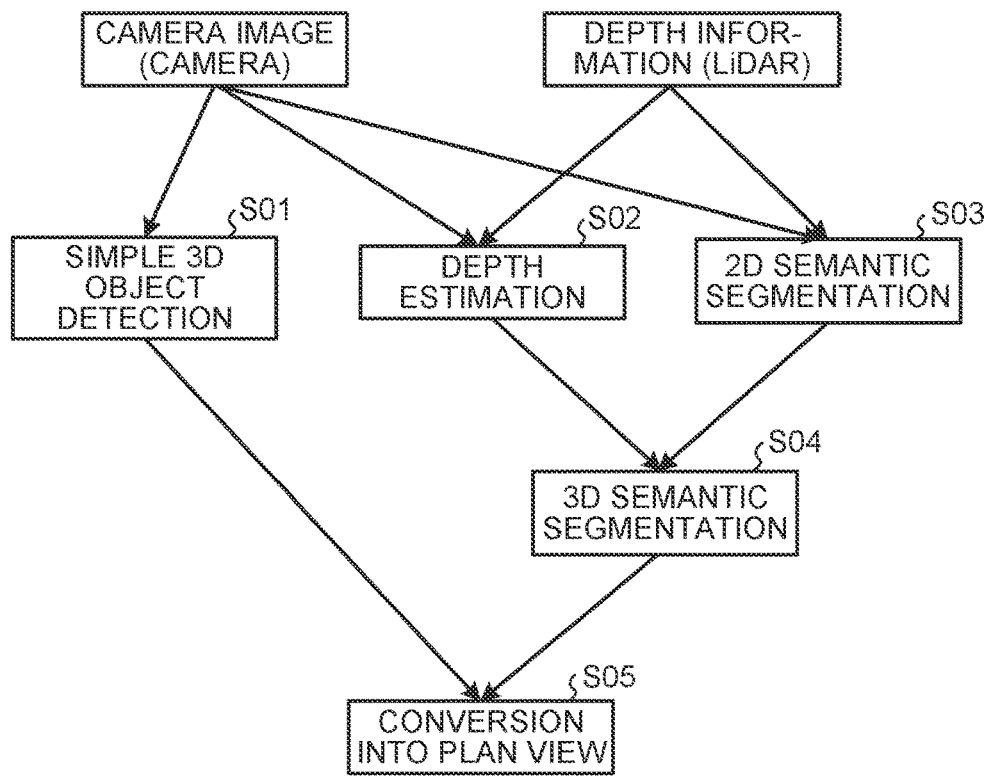
FIG. 5 is a diagram for describing an example of processing executed by a plan view converting unit according to the embodiment of the disclosure.

A specific example of processing performed by the plan view converting unit 73c will be described with reference to FIG. 5. FIG. 5 is a diagram for describing an example of processing executed by the plan view converting unit 73c according to the embodiment of the disclosure.

As illustrated in FIG. 5, the plan view converting unit 73c (see FIG. 3) performs simple 3D object detection on the basis of the camera image acquired from the camera 51 (see FIG. 1) (Step S01). As a result, the plan view converting unit 73c detects an object on an elevation view. Note that, by this processing, the plan view converting unit 73c also detects the orientation and others of the other vehicles 100 illustrated in the camera image.

Furthermore, the plan view converting unit 73c performs learning for estimating the depth of an object located ahead of the host vehicle 1 on the basis of the camera image acquired from the camera 51 and the depth information acquired from the LiDAR 53 (see FIG. 1) (Step S02).

Furthermore, the plan view converting unit 73c performs 2D semantic segmentation on the basis of the camera image acquired from the camera 51 and the depth information acquired from the LiDAR 53 (Step S03). From this, the plan view converting unit 73c determines the class of the other vehicles 100 for each pixel of the camera image.

Then, the plan view converting unit 73c performs 3D semantic segmentation on the basis of the result obtained in the processing of Step S02 and the result obtained in the processing of Step S03 (Step S04). With this, the plan view converting unit 73c combines the estimated depth and class of the other vehicles 100.

Finally, the plan view converting unit 73c converts the camera image into a plan view on the basis of the result obtained by the processing in Step S01 and the result obtained in Step S04 (Step S05). As a result, the recognition unit 73 can acquire a plan view illustrating the situation ahead of the host vehicle 1 including the orientation of the other vehicles 100 as illustrated in (b) of FIG. 4.

Note that, in the present disclosure, the conversion processing from the camera image to the plan view is not limited to the example of FIG. 5, and various other methods can be used.

Let us return to the description of FIG. 3. The detection unit 74 detects a vacant space Rv (see FIG. 9) present ahead of the host vehicle 1 on the basis of the plan view illustrating the situation ahead of the host vehicle 1 acquired by the recognition unit 73. Specifically, the detection unit 74 detects the vacant space Rv present inside a preset interest area R in the plan view that has been acquired.

The determination unit 75 determines whether or not the host vehicle 1 can be parked in the vacant space Rv detected in the interest area R.

Figure 6:
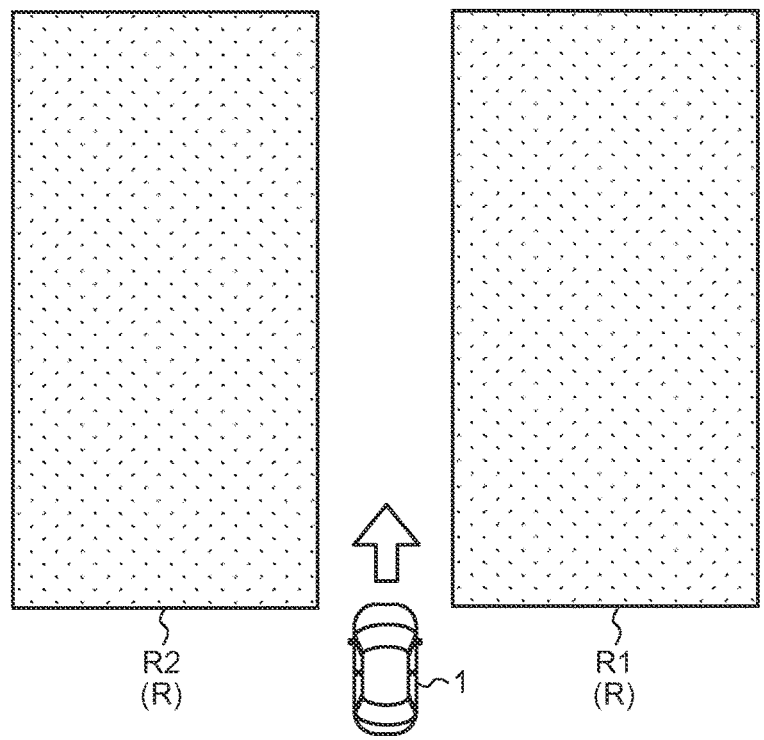
FIG. 6 is a plan view illustrating an example of an interest area according to the embodiment of the disclosure.

FIG. 6 is a plan view illustrating an example of the interest area R according to the embodiment of the disclosure. As illustrated in FIG. 6, the detection unit 74 (see FIG. 3) sets, as the interest area R, an area ahead of the host vehicle 1 but excluding a space in front of the host vehicle 1. That is, the interest area R according to the embodiment includes a first area R1 located on the front right side of the host vehicle 1 excluding the space in front of the host vehicle 1 and a second area R2 located on the front left side of the host vehicle 1 excluding the space in front of the host vehicle 1.

For example, the first area R1 and the second area R2 have a predetermined width (for example, a range of 2 (m) to 20 (m) from the host vehicle 1) along a direction perpendicular to the traveling direction of the host vehicle 1 from the host vehicle 1 as a reference.

For example, the first area R1 and the second area R2 have a predetermined depth (for example, the measurement range of the camera 51 and the LiDAR 53) along the traveling direction of the host vehicle 1 from the host vehicle 1 as a reference.

Incidentally, in the embodiment, by setting in advance the interest area R from which the vacant space Rv is to be detected, the detection processing of the vacant space Rv can be simplified, and thus the vacant space Rv can be quickly detected.

In the embodiment, by removing the space in front of the host vehicle 1 estimated to be the traveling path of the host vehicle 1 from the interest area R, it is possible to suppress erroneous detection of a vacant space Rv on the traveling path of the host vehicle 1. Therefore, according to the embodiment, the detection accuracy of the vacant space Rv can be improved.

Next, specific detection processing of the vacant space Rv will be described with reference to FIGS. 7 to 9. Note that, in the example of FIGS. 7 to 9, detection processing of the vacant space Rv in the first area R1 located on the front right side of the host vehicle 1 in the interest area R will be described.

Figure 7:
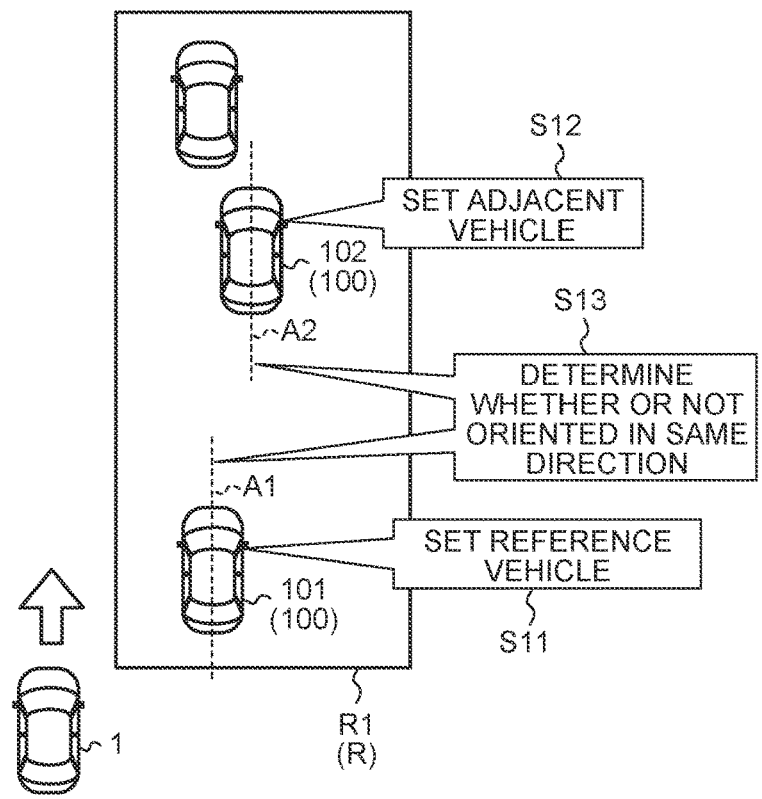
FIG. 7 is a diagram for describing an example of processing executed by a detection unit according to the embodiment of the disclosure.
Figure 8:
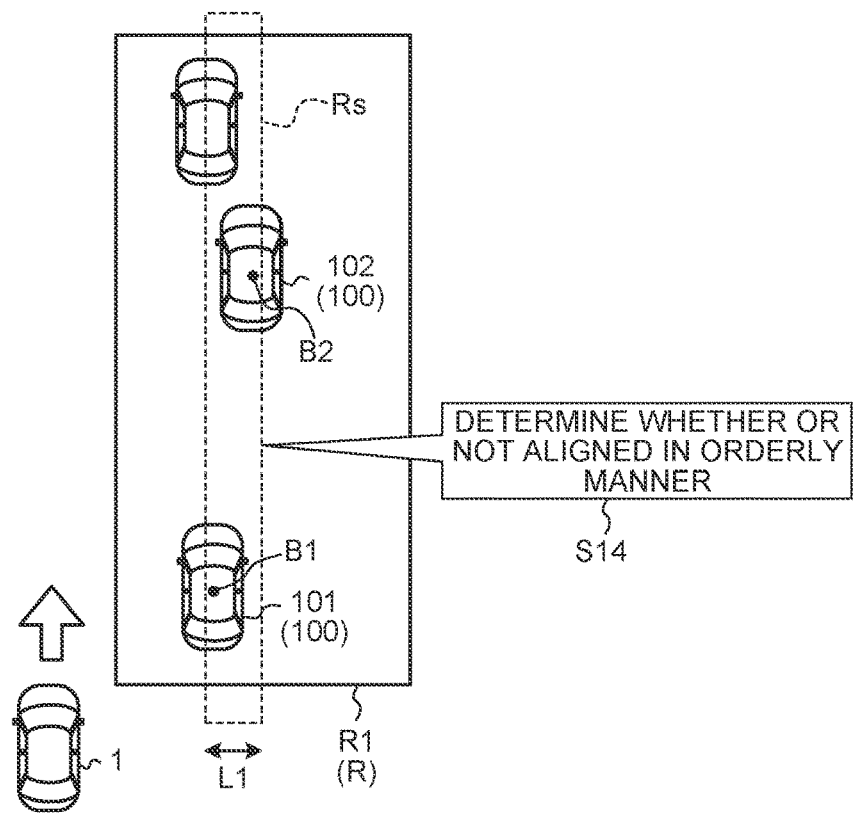
FIG. 8 is a diagram for describing an example of processing executed by the detection unit according to the embodiment of the disclosure.

FIGS. 7 and 8 are diagrams for describing an example of processing executed by the detection unit 74 according to the embodiment of the disclosure. As illustrated in FIG. 7, the detection unit 74 (see FIG. 3) first sets one of a plurality of other vehicles 100 in the interest area R as a reference vehicle 101 (Step S11).

For example, the detection unit 74 sets, as the reference vehicle 101, another vehicle 100 closest to the host vehicle 1 among the plurality of other vehicles 100 present in the interest area R (first area R1 in the drawing).

Next, the detection unit 74 sets another vehicle 100 adjacent to the reference vehicle 101 among the plurality of other vehicles 100 present in the interest area R (first area R1 in the drawing) same as that of the reference vehicle 101 as an adjacent vehicle 102 (Step S12).

Next, the detection unit 74 determines whether or not the reference vehicle 101 and the adjacent vehicle 102 are oriented in the same direction (Step S13).

Specifically, the detection unit 74 derives the central axis A1 of the reference vehicle 101 and the central axis A2 of the adjacent vehicle 102.

Next, the detection unit 74 evaluates an angle formed by the central axis A1 of the reference vehicle 101 and the central axis A2 of the adjacent vehicle 102. In a case where this angle is less than or equal to a predetermined angle (for example, 10 (°)), the detection unit 74 determines that the reference vehicle 101 and the adjacent vehicle 102 are parked in a state of being oriented in the same direction.

That is, in the present disclosure, "the reference vehicle 101 and the adjacent vehicle 102 are oriented in the same direction" is not limited to a case where the front ends (front) of both vehicles are oriented in the same direction but also includes a case where the front ends (front) of both vehicles are oriented in opposite directions.

Contrarily, in a case where the angle formed by the central axis A1 and the central axis A2 is larger than the predetermined angle, the detection unit 74 determines that the reference vehicle 101 and the adjacent vehicle 102 are parked in a state of being oriented in different directions and starts again from the setting processing of the reference vehicle 101.

A method of starting again from the setting processing of the reference vehicle 101 is, for example, as follows. First, the detection unit 74 sets, as a new reference vehicle 101, another vehicle 100 (for example, the former adjacent vehicle 102) that is second closest to the host vehicle 1 after the former reference vehicle 101 among the plurality of other vehicles 100 present in the interest area R.

Furthermore, the detection unit 74 sets, as an adjacent vehicle 102, another vehicle 100 that is different from the other vehicle 100 that has been set as the reference vehicle 101 until immediately before among the plurality of other vehicles 100 adjacent to the reference vehicle 101 that has been newly set.

In addition, in the example of FIG. 7, since the central axes A1 and A2 of the reference vehicle 101 and the adjacent vehicle 102, respectively, and a direction in which the reference vehicle 101 and the adjacent vehicle 102 are arranged are oriented in substantially the same direction, the detection unit 74 determines that the reference vehicle 101 and the adjacent vehicle 102 are parked in parallel.

Next, as illustrated in FIG. 8, in a case where the reference vehicle 101 and the adjacent vehicle 102 are oriented in the same direction, the detection unit 74 (see FIG. 3) determines whether or not the reference vehicle 101 and the adjacent vehicle 102 are aligned in an orderly manner (Step S14).

Specifically, the detection unit 74 derives the position of the center B1 of the reference vehicle 101 and the position of the center B2 of the adjacent vehicle 102. Next, the detection unit 74 determines whether or not both the center B1 of the reference vehicle 101 and the center B2 of the adjacent vehicle 102 extend along the traveling direction of the host vehicle 1 and are located inside a band-shaped area Rs having a predetermined width L1 (for example, 2 (m)).

Then, in a case where both the center B1 of the reference vehicle 101 and the center B2 of the adjacent vehicle 102 are located inside the band-shaped area Rs, the detection unit 74 determines that the reference vehicle 101 and the adjacent vehicle 102 are aligned in an orderly manner.

That is, in the embodiment, when the center B1 of the reference vehicle 101 and the center B2 of the adjacent vehicle 102 are close to each other (distance being less than or equal to the width L1) in the direction (lateral direction) perpendicular to the traveling direction of the host vehicle 1, it is determined that the reference vehicle 101 and the adjacent vehicle 102 are aligned in an orderly manner.

Contrarily, in a case where the center B1 of the reference vehicle 101 or the center B2 of the adjacent vehicle 102 is not located inside the band-shaped area Rs, the detection unit 74 determines that the reference vehicle 101 and the adjacent vehicle 102 are not aligned in an orderly manner and starts again from the setting processing of the reference vehicle 101.

Figure 9:
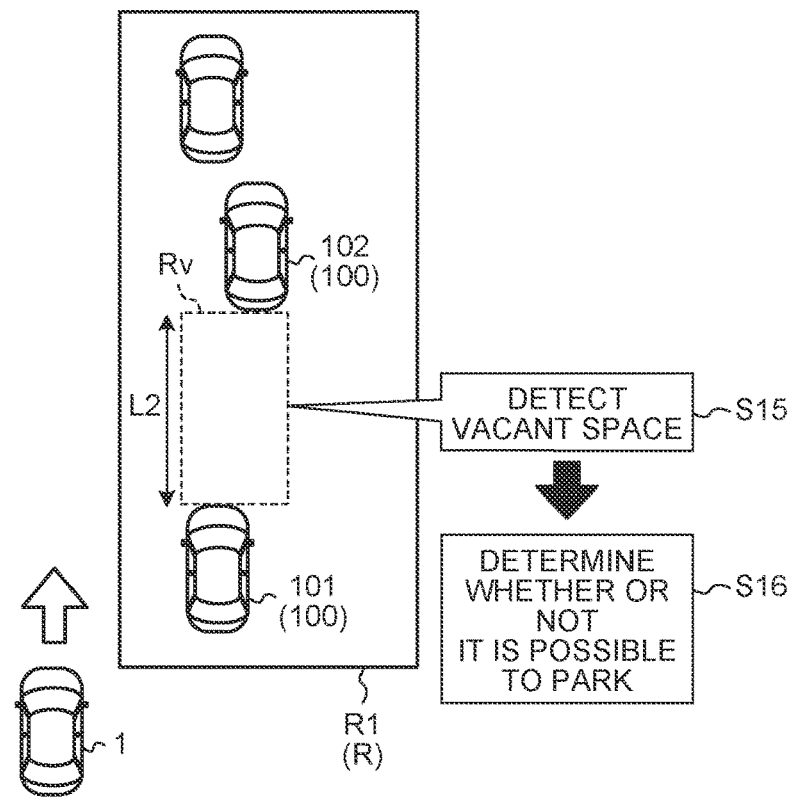
FIG. 9 is a diagram for describing an example of processing executed by the detection unit and a determination unit according to the embodiment of the disclosure.

FIG. 9 is a diagram for describing an example of processing executed by the detection unit 74 and the determination unit 75 according to the embodiment of the disclosure. As illustrated in FIG. 9, in a case where it is determined that the reference vehicle 101 and the adjacent vehicle 102 are aligned in an orderly manner, the detection unit 74 (see FIG. 3) detects a rectangular space between the reference vehicle 101 and the adjacent vehicle 102 as a vacant space Rv (Step S15).

Then, the determination unit 75 (see FIG. 3) determines whether or not the host vehicle 1 can be parked in the rectangular vacant space Rv detected by the detection unit 74 (Step S16).

Specifically, first, the determination unit 75 measures the width L2 of the vacant space Rv. The width L2 is, for example, the length of a side along the direction in which the reference vehicle 101 and the adjacent vehicle 102 are arranged among the four sides of the rectangular vacant space Rv.

Next, in a case where the measured width L2 is greater than or equal to a predetermined length, the determination unit 75 determines that the host vehicle 1 can be parked in the vacant space Rv. The value of the predetermined length varies between a case where the reference vehicle 101 and the adjacent vehicle 102 are parked in parallel and a case where they are parked side by side.

In the example of FIG. 9, since the reference vehicle 101 and the adjacent vehicle 102 are parked in parallel, in a case where the width L2 is, for example, wider than or equal to 7 (m), the determination unit 75 determines that the host vehicle 1 can be parked in the vacant space Rv.

Then, in a case where it is determined that the host vehicle 1 can be parked in the vacant space Rv, the HMI 31 (see FIG. 1) suggests the vacant space Rv to the driver or the like as a parking frame in which the host vehicle 1 can be parked.

On the other hand, in a case where the width L2 of the vacant space Rv is narrower than the predetermined length, the determination unit 75 determines that the host vehicle 1 cannot be parked in the vacant space Rv and starts again from the setting processing of the reference vehicle 101.

As described above, in the embodiment, the vacant space Rv in which the host vehicle 1 can be parked is detected on the basis of the positional relationship between a plurality of other vehicles 100 located inside the interest area R, and the vacant space Rv is suggested as the parking frame to the driver or the like. As a result, even in a case where there is no information of partition lines, the parking frame can be suggested to the driver or the like.

Furthermore, in the embodiment, it is preferable to perform evaluation after converting the positional relationship among the plurality of other vehicles 100 located ahead of the host vehicle 1 into a plan view by the plan view converting unit 73c. As a result, it is also made possible to detect the vacant space Rv present at a place distant from the host vehicle 1. Therefore, according to the embodiment, such a vacant space Rv can be detected before the host vehicle 1 approaches the vacant space Rv.

In the embodiment, the vacant space Rv in which the host vehicle 1 can be parked is preferably detected on the basis of the positional relationship between the reference vehicle 101 and the adjacent vehicle 102 located inside the interest area R. As a result, the vacant space Rv closer to the host vehicle 1 can be accurately detected.

Moreover, in the embodiment, it is determined whether or not the reference vehicle 101 and the adjacent vehicle 102 are aligned in an orderly manner on the basis of the center B1 and the central axis A1 of the reference vehicle 101 and the center B1 and the central axis A1 of the adjacent vehicle 102. It is preferable that, in a case where it is determined that the reference vehicle 101 and the adjacent vehicle 102 are aligned in an orderly manner, a space between the reference vehicle 101 and the adjacent vehicle 102 is detected as the vacant space Rv.

As a result, it is made possible to suppress erroneous detection, as a vacant space Rv, of a place that is inappropriate for a parking frame (for example, a traveling path or the like of the host vehicle 1 or the other vehicles 100). Therefore, according to the embodiment, the detection accuracy of the vacant space Rv can be improved.

In addition, in the embodiment, it is preferable to acquire a plan view illustrating the situation ahead of the host vehicle 1 on the basis of the camera image acquired from the camera 51 mounted on the host vehicle 1 and the depth information acquired from the LiDAR 53. As a result, it is possible to acquire a highly accurate plan view illustrating the situation ahead of the host vehicle 1 including the orientation of the other vehicles 100, and thus, it is possible to improve the detection accuracy of the vacant space Rv.

First Modification

Figure 10:
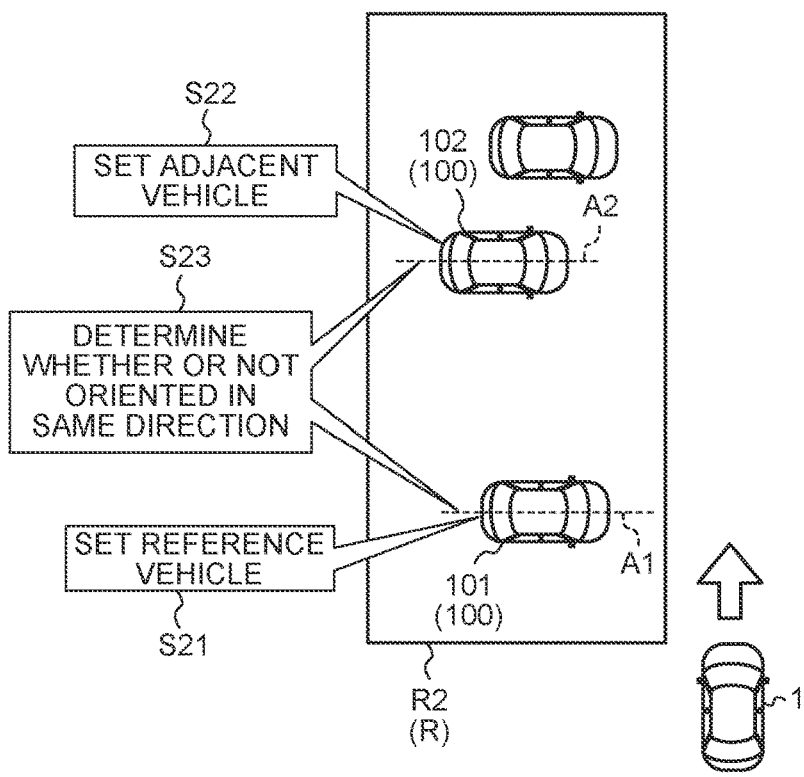
FIG. 10 is a diagram for describing an example of processing executed by a detection unit according to a first modification of the embodiment of the disclosure.
Figure 11:
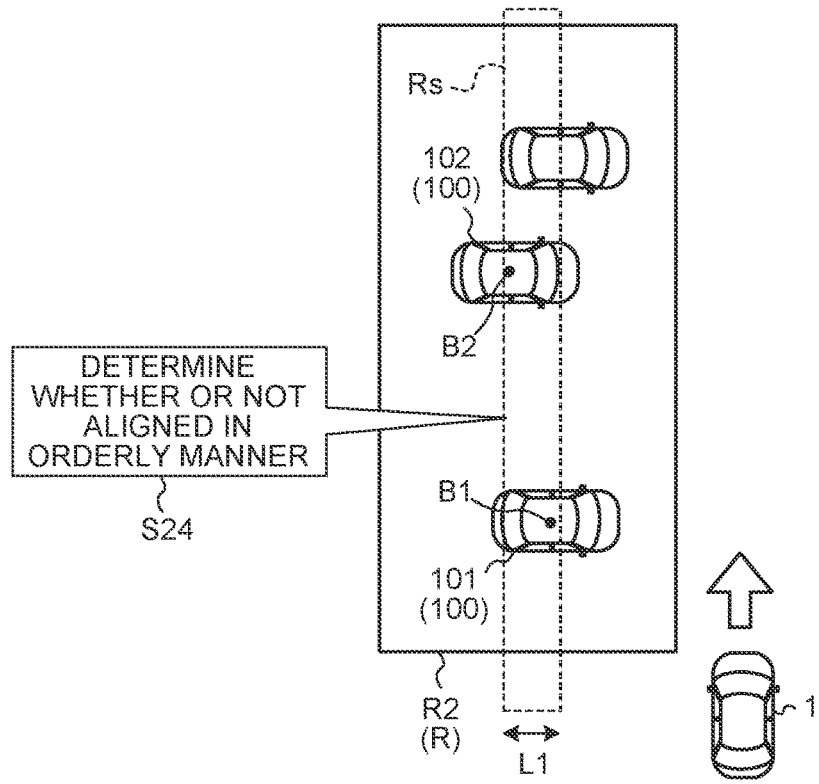
FIG. 11 is a diagram for describing an example of processing executed by the detection unit according to the first modification of the embodiment of the disclosure.

Next, details of information processing according to various modifications of the embodiment will be described. FIGS. 10 and 11 are diagrams for describing an example of processing executed by the detection unit 74 according to a first modification of the embodiment of the disclosure. Note that, in the examples of FIGS. 10 to 12, the detection processing of a vacant space Rv in the second area R2 located on the front left side of the host vehicle 1 in the interest area R will be described.

As illustrated in FIG. 10, the detection unit 74 (see FIG. 3) first sets one of a plurality of other vehicles 100 in the interest area R as the reference vehicle 101 (Step S21).

For example, the detection unit 74 sets, as the reference vehicle 101, another vehicle 100 closest to the host vehicle 1 among the plurality of other vehicles 100 present in the interest area R (second area R2 in the drawing).

Next, the detection unit 74 sets another vehicle 100 adjacent to the reference vehicle 101 among the plurality of other vehicles 100 present in the interest area R (second area R2 in the drawing) same as that of the reference vehicle 101 as the adjacent vehicle 102 (Step S22).

Next, the detection unit 74 determines whether or not the reference vehicle 101 and the adjacent vehicle 102 are oriented in the same direction (Step S23). Specifically, the detection unit 74 derives the central axis A1 of the reference vehicle 101 and the central axis A2 of the adjacent vehicle 102.

Next, the detection unit 74 evaluates an angle formed by the central axis A1 of the reference vehicle 101 and the central axis A2 of the adjacent vehicle 102. In a case where this angle is less than or equal to a predetermined angle (for example, 10 (°)), the detection unit 74 determines that the reference vehicle 101 and the adjacent vehicle 102 are parked in a state of being oriented in the same direction.

Contrarily, in a case where the angle formed by the central axis A1 and the central axis A2 is larger than the predetermined angle, the detection unit 74 determines that the reference vehicle 101 and the adjacent vehicle 102 are parked in a state of being oriented in different directions and starts again from the setting processing of the reference vehicle 101.

In addition, in the example of FIG. 10, since the central axes A1 and A2 of the reference vehicle 101 and the adjacent vehicle 102, respectively, and a direction in which the reference vehicle 101 and the adjacent vehicle 102 are arranged are substantially perpendicular to each other, the detection unit 74 determines that the reference vehicle 101 and the adjacent vehicle 102 are parked side by side.

Next, as illustrated in FIG. 11, in a case where the reference vehicle 101 and the adjacent vehicle 102 are oriented in the same direction, the detection unit 74 (see FIG. 3) determines whether or not the reference vehicle 101 and the adjacent vehicle 102 are aligned in an orderly manner (Step S24).

Specifically, the detection unit 74 derives the position of the center B1 of the reference vehicle 101 and the position of the center B2 of the adjacent vehicle 102. Next, the detection unit 74 determines whether or not both the center B1 of the reference vehicle 101 and the center B2 of the adjacent vehicle 102 extend along the traveling direction of the host vehicle 1 and are located inside a band-shaped area Rs having a predetermined width L1.

Then, in a case where both the center B1 of the reference vehicle 101 and the center B2 of the adjacent vehicle 102 are located inside the band-shaped area Rs, the detection unit 74 determines that the reference vehicle 101 and the adjacent vehicle 102 are aligned in an orderly manner.

Contrarily, in a case where the center B1 of the reference vehicle 101 or the center B2 of the adjacent vehicle 102 is not located inside the band-shaped area Rs, the detection unit 74 determines that the reference vehicle 101 and the adjacent vehicle 102 are not aligned in an orderly manner and starts again from the setting processing of the reference vehicle 101.

Figure 12:
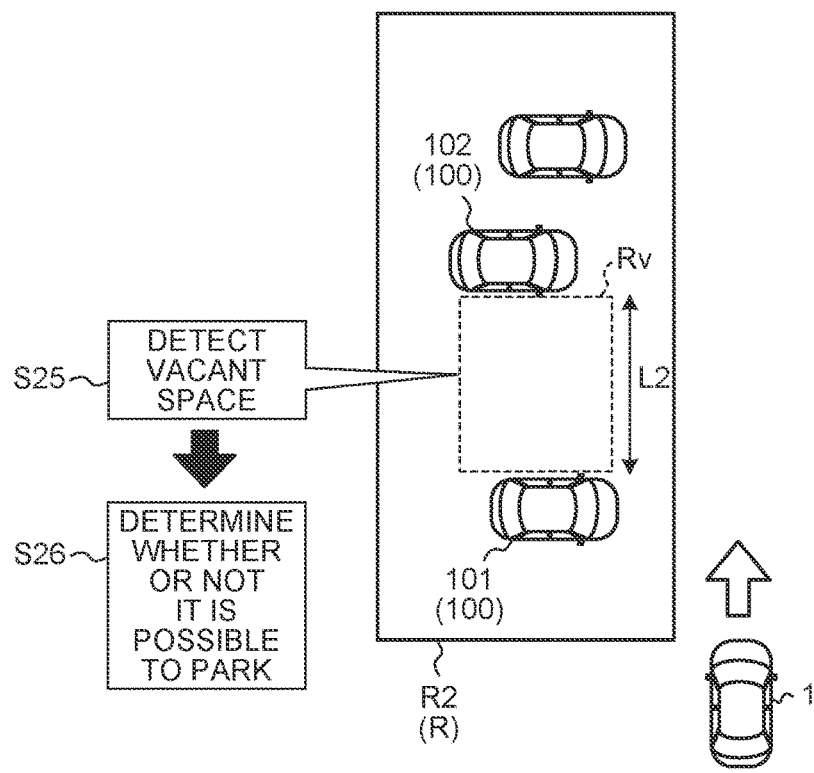
FIG. 12 is a diagram for describing an example of processing executed by the detection unit and a determination unit according to the first modification of the embodiment of the disclosure.

FIG. 12 is a diagram for describing an example of processing executed by the detection unit 74 and the determination unit 75 according to the first modification of the embodiment of the disclosure. As illustrated in FIG. 12, in a case where it is determined that the reference vehicle 101 and the adjacent vehicle 102 are aligned in an orderly manner, the detection unit 74 (see FIG. 3) detects a rectangular space between the reference vehicle 101 and the adjacent vehicle 102 as a vacant space Rv (Step S25).

Then, the determination unit 75 (see FIG. 3) determines whether or not the host vehicle 1 can be parked in the rectangular vacant space Rv detected by the detection unit 74 (Step S26).

Specifically, first, the determination unit 75 measures the width L2 of the vacant space Rv. The width L2 is, for example, the length of a side along the direction in which the reference vehicle 101 and the adjacent vehicle 102 are arranged among the four sides of the rectangular vacant space Rv.

Next, in a case where the measured width L2 is greater than or equal to a predetermined length, the determination unit 75 determines that the host vehicle 1 can be parked in the vacant space Rv. In the example of FIG. 12, since the reference vehicle 101 and the adjacent vehicle 102 are parked side by side, in a case where the width L2 is, for example, wider than or equal to 2.5 (m), the determination unit 75 determines that the host vehicle 1 can be parked in the vacant space Rv.

Then, in a case where it is determined that the host vehicle 1 can be parked in the vacant space Rv, the HMI 31 (see FIG. 1) suggests the vacant space Rv to the driver or the like as a parking frame in which the host vehicle 1 can be parked.

On the other hand, in a case where the width L2 of the vacant space Rv is narrower than the predetermined length, the determination unit 75 determines that the host vehicle 1 cannot be parked in the vacant space Rv and starts again from the setting processing of the reference vehicle 101.

As described above, in the first modification, even in a case where the plurality of other vehicles 100 located inside the interest area R is parked side by side, it is possible to detect the vacant space Rv in which the host vehicle 1 can be parked and to suggest the vacant space Rv to the driver or the like as the parking frame.

Second Modification

Figure 13:
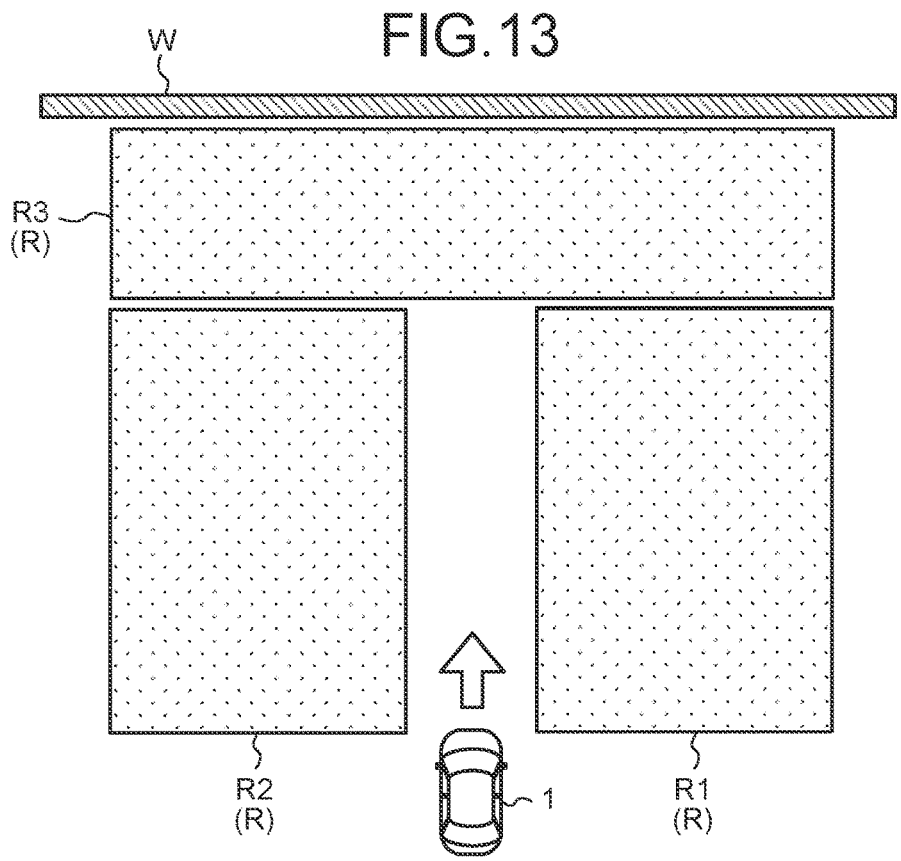
FIG. 13 is a plan view illustrating an example of an interest area according to a second modification of the embodiment of the disclosure.

FIG. 13 is a plan view illustrating an example of the interest area R according to a second modification of the embodiment of the disclosure. As illustrated in FIG. 13, in the second modification, it is estimated that there is a boundary portion W of a parking lot in a space in front of the host vehicle 1. In this case, the detection unit 74 (see FIG. 3) sets a third area R3 as the interest area R in addition to the first area R1 and the second area R2 described above.

The third area R3 is an area along the boundary portion W in front of the boundary portion W including the space in front of the host vehicle 1. This is because an area along the boundary portion W such as a wall is also generally used as a parking area in a parking lot.

For example, with the host vehicle 1 being as a reference, the third area R3 has a predetermined width (for example, a range of 20 (m) to the left side and the right side each from the host vehicle 1) along a direction perpendicular to the traveling direction of the host vehicle 1. For example, the third area R3 has a predetermined depth (for example, a range of 20 (m) from the boundary portion W toward the front side) from the boundary portion W toward the host vehicle 1.

As described above, in the second modification, in a case where it is estimated that the boundary portion W of the parking lot is present in the space in front of the host vehicle 1, the area adjacent to the boundary portion W is included in the interest area R including the space in front of the host vehicle 1. As a result, it is possible to increase options of parking frames that can be suggested to the driver or the like.

Note that, in the present disclosure, examples of means for estimating the presence of the boundary portion W include that performed on the basis of the camera image, a measurement result of the LiDAR 53, or the like and that performed on the basis of the high-precision map or the like accumulated in the map information accumulating unit 23.

Figure 14:
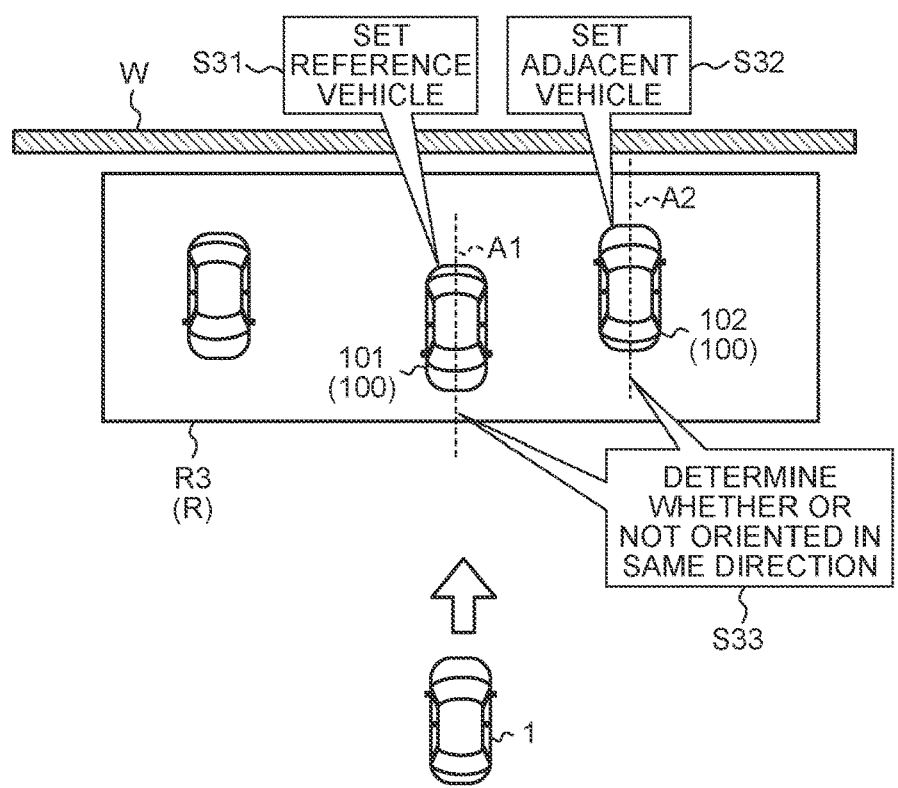
FIG. 14 is a diagram for describing an example of processing executed by a detection unit according to the second modification of the embodiment of the disclosure.
Figure 15:
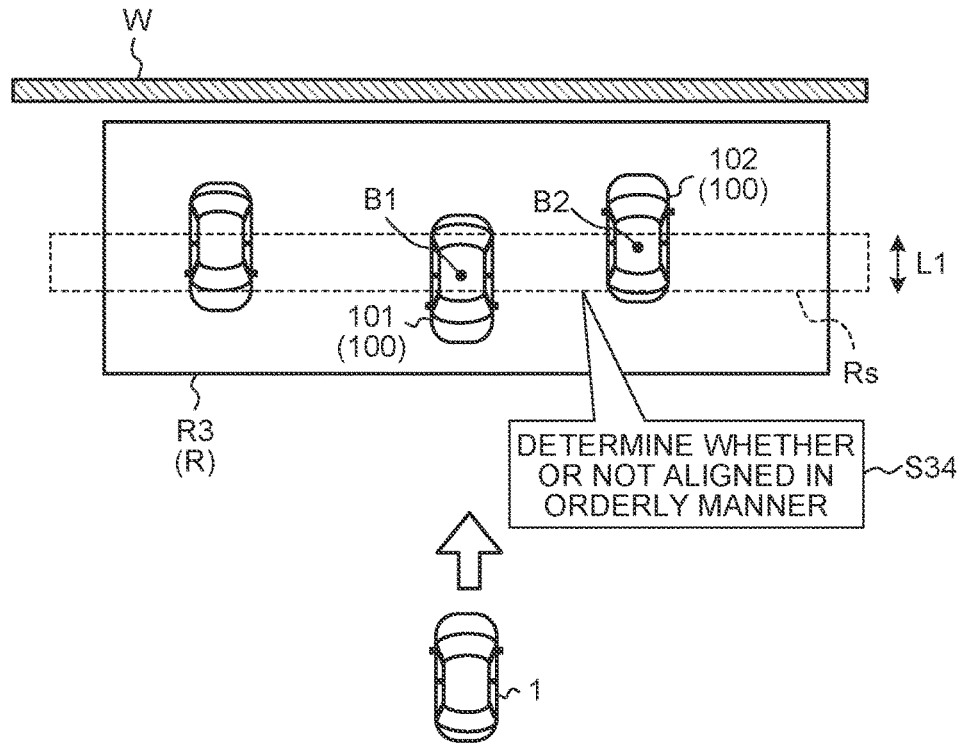
FIG. 15 is a diagram for describing an example of processing executed by the detection unit according to the second modification of the embodiment of the disclosure.

FIGS. 14 and 15 are diagrams for describing an example of processing executed by the detection unit 74 according to a second modification of the embodiment of the disclosure. Note that, in the examples of FIGS. 14 to 16, detection processing of a vacant space Rv in the third area R3 located in the vicinity of the boundary portion W in the interest area R will be described.

As illustrated in FIG. 14, the detection unit 74 (see FIG. 3) first sets one of a plurality of other vehicles 100 in the interest area R as a reference vehicle 101 (Step S31).

For example, the detection unit 74 sets, as the reference vehicle 101, another vehicle 100 closest to the host vehicle 1 among the plurality of other vehicles 100 present in the interest area R (third area R3 in the drawing).

Next, the detection unit 74 sets another vehicle 100 adjacent to the reference vehicle 101 among the plurality of other vehicles 100 present in the interest area R (third area R3 in the drawing) same as that of the reference vehicle 101 as an adjacent vehicle 102 (Step S32).

Next, the detection unit 74 determines whether or not the reference vehicle 101 and the adjacent vehicle 102 are oriented in the same direction (Step S33). Specifically, the detection unit 74 derives the central axis A1 of the reference vehicle 101 and the central axis A2 of the adjacent vehicle 102.

Next, the detection unit 74 evaluates an angle formed by the central axis A1 of the reference vehicle 101 and the central axis A2 of the adjacent vehicle 102. In a case where this angle is less than or equal to a predetermined angle (for example, 10 (°)), the detection unit 74 determines that the reference vehicle 101 and the adjacent vehicle 102 are parked in a state of being oriented in the same direction.

Contrarily, in a case where the angle formed by the central axis A1 and the central axis A2 is larger than the predetermined angle, the detection unit 74 determines that the reference vehicle 101 and the adjacent vehicle 102 are parked in a state of being oriented in different directions and starts again from the setting processing of the reference vehicle 101.

In addition, in the example of FIG. 14, since the central axes A1 and A2 of the reference vehicle 101 and the adjacent vehicle 102, respectively, and a direction in which the reference vehicle 101 and the adjacent vehicle 102 are arranged are substantially perpendicular to each other, the detection unit 74 determines that the reference vehicle 101 and the adjacent vehicle 102 are parked side by side.

Next, as illustrated in FIG. 15, in a case where the reference vehicle 101 and the adjacent vehicle 102 are oriented in the same direction, the detection unit 74 (see FIG. 3) determines whether or not the reference vehicle 101 and the adjacent vehicle 102 are aligned in an orderly manner (Step S34).

Specifically, the detection unit 74 derives the position of the center B1 of the reference vehicle 101 and the position of the center B2 of the adjacent vehicle 102. Next, the detection unit 74 determines whether or not both the center B1 of the reference vehicle 101 and the center B2 of the adjacent vehicle 102 extend along a direction perpendicular to the traveling direction of the host vehicle 1 and are located inside a band-shaped area Rs having a predetermined width L1.

Then, in a case where both the center B1 of the reference vehicle 101 and the center B2 of the adjacent vehicle 102 are located inside the band-shaped area Rs, the detection unit 74 determines that the reference vehicle 101 and the adjacent vehicle 102 are aligned in an orderly manner.

Contrarily, in a case where the center B1 of the reference vehicle 101 or the center B2 of the adjacent vehicle 102 is not located inside the band-shaped area Rs, the detection unit 74 determines that the reference vehicle 101 and the adjacent vehicle 102 are not aligned in an orderly manner and starts again from the setting processing of the reference vehicle 101.

Figure 16:
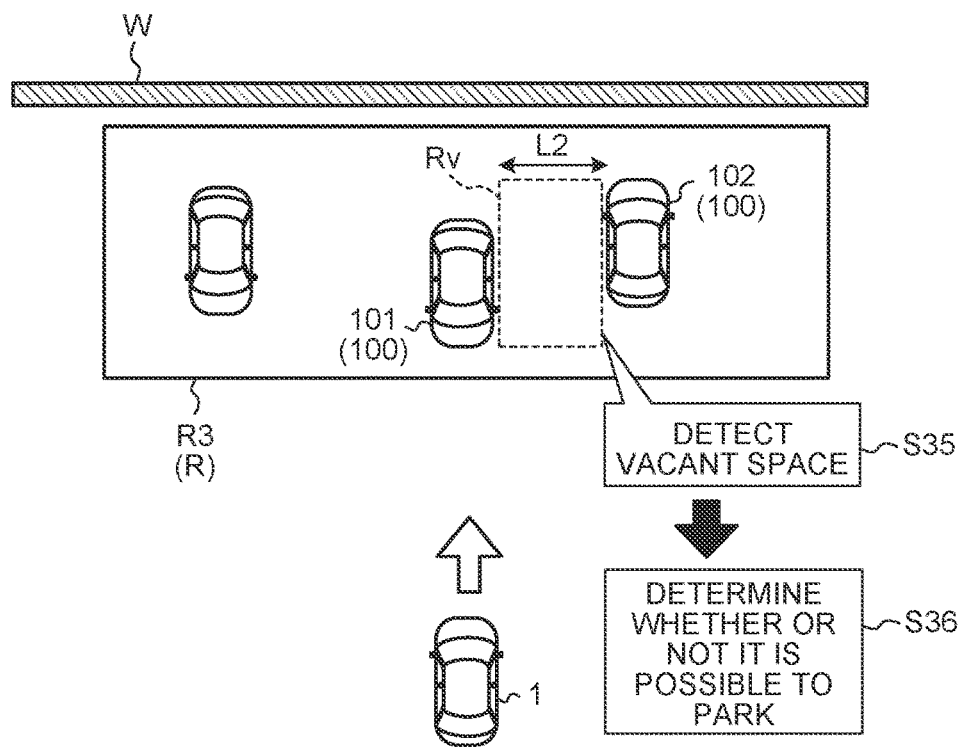
FIG. 16 is a diagram for describing an example of processing executed by the detection unit and a determination unit according to the second modification of the embodiment of the disclosure.

FIG. 16 is a diagram for describing an example of processing executed by the detection unit 74 and a determination unit 75 according to the second modification of the embodiment of the disclosure. As illustrated in FIG. 12, in a case where it is determined that the reference vehicle 101 and the adjacent vehicle 102 are aligned in an orderly manner, the detection unit 74 (see FIG. 3) detects a rectangular space between the reference vehicle 101 and the adjacent vehicle 102 as a vacant space Rv (Step S35).

Then, the determination unit 75 (see FIG. 3) determines whether or not the host vehicle 1 can be parked in the rectangular vacant space Rv detected by the detection unit 74 (Step S36).

Specifically, first, the determination unit 75 measures the width L2 of the vacant space Rv. The width L2 is, for example, the length of a side along the direction in which the reference vehicle 101 and the adjacent vehicle 102 are arranged among the four sides of the rectangular vacant space Rv.

Next, in a case where the measured width L2 is greater than or equal to a predetermined length, the determination unit 75 determines that the host vehicle 1 can be parked in the vacant space Rv. In the example of FIG. 12, since the reference vehicle 101 and the adjacent vehicle 102 are parked side by side, in a case where the width 12 is, for example, wider than or equal to 2.5 (m), the determination unit 75 determines that the host vehicle 1 can be parked in the vacant space Rv.

Then, in a case where it is determined that the host vehicle 1 can be parked in the vacant space Rv, the HMI 31 (see FIG. 1) suggests the vacant space Rv to the driver or the like as a parking frame in which the host vehicle 1 can be parked.

On the other hand, in a case where the width L2 of the vacant space Rv is narrower than the predetermined length, the determination unit 75 determines that the host vehicle 1 cannot be parked in the vacant space Rv and starts again from the setting processing of the reference vehicle 101.

As described above, in the second modification, even in a case where the interest area R is extended to the third area R3, it is possible to detect the vacant space Rv in which the host vehicle 1 can be parked and to suggest the vacant space Rv as the parking frame to the driver or the like.

<Procedure of Control Processing>

Figure 17:
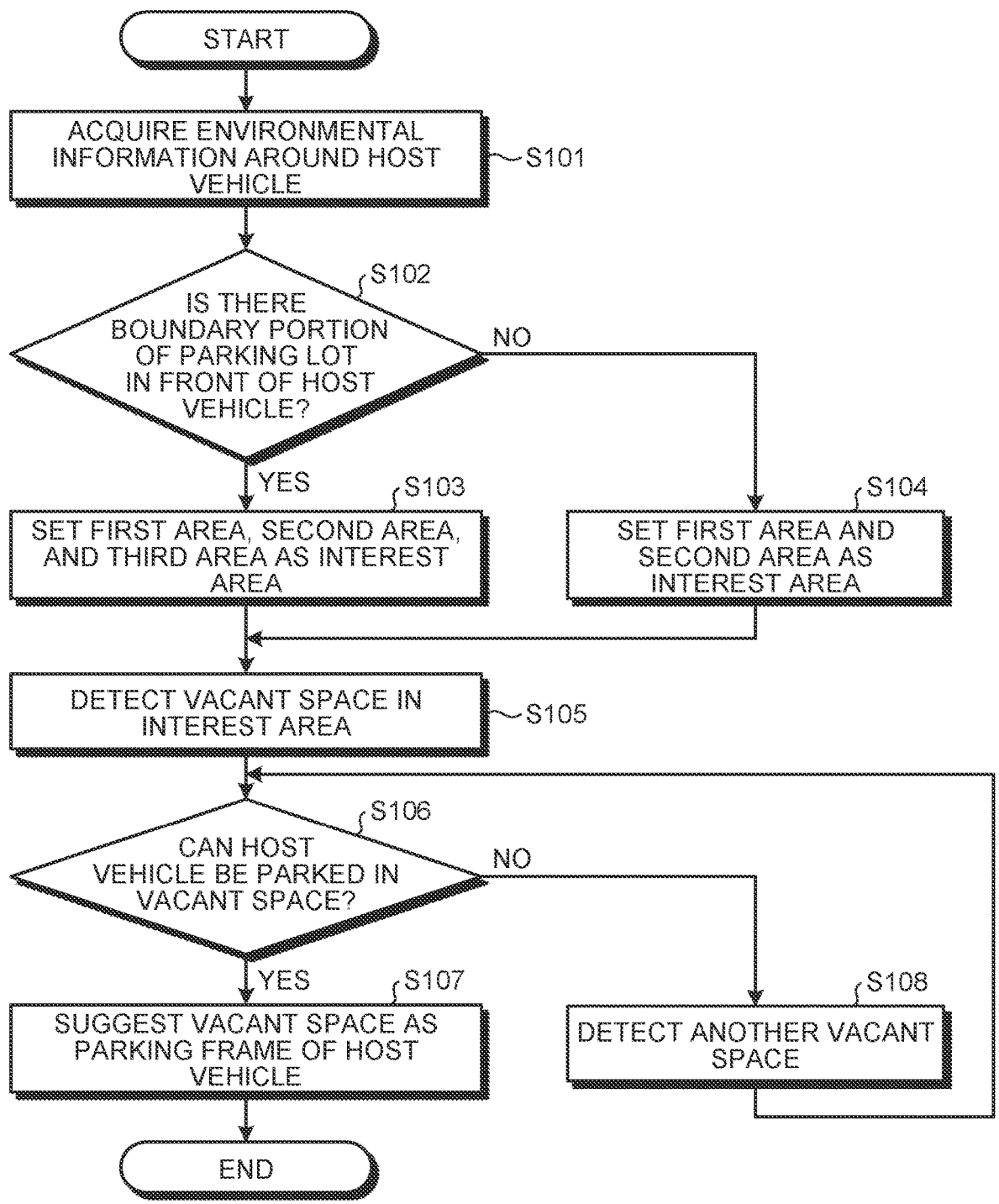
FIG. 17 is a flowchart illustrating an example of a procedure of control processing executed by the analysis unit according to the embodiment of the disclosure.

Next, a procedure of control processing according to the embodiment will be described with reference to FIG. 17. FIG. 17 is a flowchart illustrating an example of the procedure of the control processing executed by the travel assistance and autonomous driving control unit 29 according to the embodiment of the present disclosure.

First, the travel assistance and autonomous driving control unit 29 acquires environmental information around the host vehicle 1 (Step S101). For example, the travel assistance and autonomous driving control unit 29 controls the recognition unit 73 to acquire a plan view illustrating the situation ahead of the host vehicle 1.

Next, the travel assistance and autonomous driving control unit 29 determines whether or not there is a boundary portion W of a parking lot in the space in front of the host vehicle 1 (Step S102). Then, if it is determined that there is a boundary portion W of a parking lot in the space in front of the host vehicle 1 (Step S102, Yes), the travel assistance and autonomous driving control unit 29 sets the first area R1, the second area R2, and the third area R3 as the interest area R (Step S103). Then, the process proceeds to Step S105 described later.

Contrarily, if it is determined that there is no boundary portion W of a parking lot in the space in front of the host vehicle 1 (Step S102, No), the travel assistance and autonomous driving control unit 29 sets the first area R1 and the second area R2 as the interest area R (Step S104).

Next, the travel assistance and autonomous driving control unit 29 detects the vacant space Rv in the interest area R (Step S105). For example, the travel assistance and autonomous driving control unit 29 detects the vacant space Rv on the basis of the positional relationship between the plurality of other vehicles 100 located inside the interest area R.

Next, the travel assistance and autonomous driving control unit 29 determines whether or not the host vehicle 1 can be parked in the vacant space Rv that has been detected (Step S106). Then, if it is determined that the host vehicle 1 can be parked in the vacant space Rv that has been detected (Step S106, Yes), the travel assistance and autonomous driving control unit 29 suggests the vacant space Rv as the parking frame of the host vehicle 1 to the driver or the like (Step S107) and ends the processing.

Contrarily, if it is determined that the host vehicle 1 cannot be parked in the vacant space Rv that has been detected (Step S106, No), the travel assistance and autonomous driving control unit 29 detects another vacant space Rv in the interest area R (Step S108) and returns to the processing of Step S106.

Effects

The information processing device (travel assistance and autonomous driving control unit 29) according to the embodiment includes the acquisition unit (recognition unit 73), the detection unit 74, and the determination unit 75. The acquisition unit (recognition unit 73) acquires environmental information around the host vehicle 1. The detection unit 74 detects the vacant space Rv in the interest area R set around the host vehicle 1 on the basis of the positional relationship between a plurality of other vehicles 100 included in the environmental information. The determination unit 75 determines whether or not the host vehicle 1 can be parked in the vacant space Rv that has been detected.

As a result, even in a case where there is no information of partition lines, the parking frame can be suggested to the driver or the like.

Furthermore, in the information processing device (travel assistance and autonomous driving control unit 29) according to the embodiment, the detection unit 74 sets one of the plurality of other vehicles 100 as the reference vehicle 101 in the interest area R. The detection unit 74 also sets another vehicle 100 adjacent to the reference vehicle 101 in the interest area R as the adjacent vehicle 102. The detection unit 74 further detects the vacant space Rv on the basis of the positional relationship between the reference vehicle 101 and the adjacent vehicle 102.

As a result, the vacant space Rv closer to the host vehicle 1 can be accurately detected.

Furthermore, in the information processing device (travel assistance and autonomous driving control unit 29) according to the embodiment, the detection unit 74 determines whether or not the reference vehicle 101 and the adjacent vehicle 102 are aligned in an orderly manner on the basis of the center B1 and the central axis A1 of the reference vehicle 101 and the center B2 and the central axis A2 of the adjacent vehicle 102. In addition, in a case where it is determined that the reference vehicle 101 and the adjacent vehicle 102 are aligned in an orderly manner, the detection unit 74 detects the vacant space Rv on the basis of the positional relationship between the reference vehicle 101 and the adjacent vehicle 102.

As a result, it is possible to improve the detection accuracy of the vacant space Rv.

Furthermore, in the information processing device (travel assistance and autonomous driving control unit 29) according to the embodiment, the detection unit 74 sets a space ahead of the host vehicle 1 but excluding the space in front of the host vehicle 1 as the interest area R.

As a result, it is possible to improve the detection accuracy of the vacant space Rv.

Furthermore, in the information processing device (travel assistance and autonomous driving control unit 29) according to the embodiment, in a case where it is estimated that the boundary portion W of the parking lot is present in the space in front of the host vehicle 1, the detection unit 74 sets an area along the boundary portion W including the space in front of the host vehicle 1 as the interest area R.

As a result, it is possible to increase options of parking frames that can be suggested to the driver or the like.

Furthermore, in the information processing device (travel assistance and autonomous driving control unit 29) according to the embodiment, the acquisition unit (recognition unit 73) acquires the environmental information from the camera 51 and the LiDAR 53 mounted on the host vehicle 1.

As a result, it is possible to improve the detection accuracy of the vacant space Rv.

Although the embodiments of the disclosure have been described above, the technical scope of the disclosure is not limited to the above embodiments as they are, and various modifications can be made without departing from the gist of the disclosure. In addition, components of different embodiments and modifications may be combined as appropriate.

Furthermore, the effects described herein are merely examples and are not limiting, and other effects may be achieved.

Note that the present technology can also have the following configurations.

(1)

An information processing device comprising:
an acquisition unit that acquires environmental information around a host vehicle;
a detection unit that detects a vacant space in an interest area set around the host vehicle on a basis of a positional relationship between a plurality of other vehicles included in the environmental information; and
a determination unit that determines whether or not the host vehicle can be parked in the vacant space that has been detected.

(2)

The information processing device according to the above (1),
wherein the detection unit:
sets one of the plurality of other vehicles in the interest area as a reference vehicle;
sets the other vehicle adjacent to the reference vehicle in the interest area as an adjacent vehicle; and
detects the vacant space on a basis of a positional relationship between the reference vehicle and the adjacent vehicle.

(3)

The information processing device according to the above (2),
wherein the detection unit:
determines whether or not the reference vehicle and the adjacent vehicle are aligned in an orderly manner on a basis of a center and a central axis of the reference vehicle and a center and a central axis of the adjacent vehicle; and
detects the vacant space on a basis of the positional relationship between the reference vehicle and the adjacent vehicle in a case where it is determined that the reference vehicle and the adjacent vehicle are aligned in an orderly manner.

(4)

The information processing device according to any one of the above (1) to (3),
wherein the detection unit sets an area ahead of the host vehicle but excluding a space in front of the host vehicle as the interest area.

(5)

The information processing device according to any one of the above (1) to (4),
wherein, in a case where it is estimated that there is a boundary portion of a parking lot in a space in front of the host vehicle, the detection unit sets an area along the boundary portion including the space in front of the host vehicle as the interest area.

(6)

The information processing device according to any one of the above (1) to (5),
wherein the acquisition unit acquires the environmental information from a camera and LiDAR mounted on the host vehicle.

(7)

An information processing method executed by a computer, the method comprising:
an acquisition step of acquiring environmental information around a host vehicle;
a detection step of detecting a vacant space in an interest area set around the host vehicle on a basis of a positional relationship between a plurality of other vehicles included in the environmental information; and
a determination step of determining whether or not the host vehicle can be parked in the vacant space that has been detected.

(8)

The information processing method according to the above (7),
wherein the detection step further includes:
setting one of the plurality of other vehicles in the interest area as a reference vehicle;
setting the other vehicle adjacent to the reference vehicle in the interest area as an adjacent vehicle; and
detecting the vacant space on a basis of a positional relationship between the reference vehicle and the adjacent vehicle.

(9)

The information processing method according to the above (8),
wherein the detection step further includes:
determining whether or not the reference vehicle and the adjacent vehicle are aligned in an orderly manner on a basis of a center and a central axis of the reference vehicle and a center and a central axis of the adjacent vehicle; and
detecting the vacant space on a basis of the positional relationship between the reference vehicle and the adjacent vehicle in a case where it is determined that the reference vehicle and the adjacent vehicle are aligned in an orderly manner.

(10)

The information processing method according to any one of the above (7) to (9),
wherein the detection step further includes:

setting an area ahead of the host vehicle but excluding a space in front of the host vehicle as the interest area.

(11) The information processing method according to any one of the above (7) to (10),
wherein the detection step further includes:
in a case where it is estimated that there is a boundary portion of a parking lot in the space in front of the host vehicle, setting an area along the boundary portion including the space in front of the host vehicle as the interest area.

(12) The information processing method according to any one of the above (7) to (11),
wherein the acquisition step further includes:
acquiring the environmental information from a camera and LiDAR mounted on the host vehicle.

(13) An information processing program for causing a computer to execute:
an acquisition procedure of acquiring environmental information around a host vehicle;
a detection procedure of detecting a vacant space in an interest area set around the host vehicle on a basis of a positional relationship between a plurality of other vehicles included in the environmental information; and
a determination procedure of determining whether or not the host vehicle can be parked in the vacant space that has been detected.

(14) The information processing program according to the item (13),
wherein the detection procedure further includes:
setting one of the plurality of other vehicles in the interest area as a reference vehicle;
setting the other vehicle adjacent to the reference vehicle in the interest area as an adjacent vehicle; and
detecting the vacant space on a basis of a positional relationship between the reference vehicle and the adjacent vehicle.

(15) The information processing program according to the item (14),
wherein the detection procedure further includes:
determining whether or not the reference vehicle and the adjacent vehicle are aligned in an orderly manner on a basis of a center and a central axis of the reference vehicle and a center and a central axis of the adjacent vehicle; and
detecting the vacant space on a basis of the positional relationship between the reference vehicle and the adjacent vehicle in a case where it is determined that the reference vehicle and the adjacent vehicle are aligned in an orderly manner.

(16) The information processing program according to any one of the above (13) to (15),
wherein the detection procedure further includes:
setting an area ahead of the host vehicle but excluding a space in front of the host vehicle as the interest area.

(17) The information processing program according to any one of the above (13) to (16),
wherein the detection procedure further includes:
in a case where it is estimated that there is a boundary portion of a parking lot in the space in front of the host vehicle, setting an area along the boundary portion including the space in front of the host vehicle as the interest area.

(18) The information processing program according to any one of the above (13) to (17),
wherein the acquisition procedure further includes:
acquiring the environmental information from a camera and LiDAR mounted on the host vehicle.

REFERENCE SIGNS LIST

1 VEHICLE (HOST VEHICLE)
29 TRAVEL ASSISTANCE AND AUTONOMOUS DRIVING CONTROL UNIT (EXAMPLE OF INFORMATION PROCESSING DEVICE)
61 ANALYSIS UNIT
73 RECOGNITION UNIT (EXAMPLE OF ACQUISITION UNIT)
73a CAMERA IMAGE ACQUIRING UNIT
73b DEPTH INFORMATION ACQUIRING UNIT
73c PLAN VIEW CONVERTING UNIT
74 DETECTION UNIT
75 DETERMINATION UNIT
100 ANOTHER VEHICLE
101 REFERENCE VEHICLE
102 ADJACENT VEHICLE
A1, A2 CENTRAL AXIS
B1, B2 CENTER
Rs BAND-SHAPED AREA
Rv VACANT SPACE
W BOUNDARY PORTION

The invention claimed is:

1. An information processing device comprising:
a memory storing instructions, and at least one processor configured to execute the instructions to perform operations comprising:
acquiring environmental information around a host vehicle;
detecting a vacant space in an interest area set around the host vehicle on a basis of a positional relationship between a plurality of other vehicles included in the environmental information;
determining whether or not the host vehicle can be parked in the vacant space that has been detected; and
in a case where it is estimated that there is a boundary portion of a parking lot in a space in front of the host vehicle, setting an area along the boundary portion including the space in front of the host vehicle as the interest area.

2. The information processing device according to claim 1, wherein the operations further comprise:
setting an area ahead of the host vehicle but excluding the space in front of the host vehicle as the interest area.

3. The information processing device according to claim 1, wherein the operations further comprise:
acquiring the environmental information from a camera and LiDAR mounted on the host vehicle.

4. An information processing device, comprising:
a memory storing instructions, and
at least one processor configured to execute the instructions to perform operations comprising:
acquiring environmental information around a host vehicle;
detecting a vacant space in an interest area set around the host vehicle on a basis of a positional relationship between a plurality of other vehicles included in the environmental information;
determining whether or not the host vehicle can be parked in the vacant space that has been detected; and
setting one of the plurality of other vehicles in the interest area as a reference vehicle;
setting another vehicle adjacent to the reference vehicle in the interest area as an adjacent vehicle;
detecting the vacant space on a basis of a positional relationship between the reference vehicle and the adjacent vehicle;
determining whether or not the reference vehicle and the adjacent vehicle are aligned in an orderly manner on a basis of a center and a central axis of the reference vehicle and a center and a central axis of the adjacent vehicle; and
detecting the vacant space on a basis of the positional relationship between the reference vehicle and the adjacent vehicle in a case where it is determined that the reference vehicle and the adjacent vehicle are aligned in an orderly manner.

5. An information processing method for execution by a computer, the method comprising:
acquiring environmental information around a host vehicle;
detecting a vacant space in an interest area set around the host vehicle on a basis of a positional relationship between a plurality of other vehicles included in the environmental information;
determining whether or not the host vehicle can be parked in the vacant space that has been detected; and
in a case where it is estimated that there is a boundary portion of a parking lot in a space in front of the host vehicle, setting an area along the boundary portion including the space in front of the host vehicle as the interest area.

6. A non-transitory computer readable medium storing a program, the program being executable by a processor to perform operations comprising:
acquiring environmental information around a host vehicle;
detecting a vacant space in an interest area set around the host vehicle on a basis of a positional relationship between a plurality of other vehicles included in the environmental information;
determining whether or not the host vehicle can be parked in the vacant space that has been detected; and
in a case where it is estimated that there is a boundary portion of a parking lot in a space in front of the host vehicle, setting an area along the boundary portion including the space in front of the host vehicle as the interest area.

7. The non-transitory computer readable medium according to claim 6, wherein the operations further comprise:
setting an area ahead of the host vehicle but excluding the space in front of the host vehicle as the interest area.

8. The non-transitory computer readable medium according to claim 6, wherein the operations further comprise:
acquiring the environmental information from a camera and LiDAR mounted on the host vehicle.

9. A non-transitory computer readable medium storing a program, the program being executable by a processor to perform operations comprising:
acquiring environmental information around a host vehicle;
detecting a vacant space in an interest area set around the host vehicle on a basis of a positional relationship between a plurality of other vehicles included in the environmental information;
determining whether or not the host vehicle can be parked in the vacant space that has been detected; and
setting one of the plurality of other vehicles in the interest area as a reference vehicle;
setting another vehicle adjacent to the reference vehicle in the interest area as an adjacent vehicle;
detecting the vacant space on a basis of a positional relationship between the reference vehicle and the adjacent vehicle;
determining whether or not the reference vehicle and the adjacent vehicle are aligned in an orderly manner on a basis of a center and a central axis of the reference vehicle and a center and a central axis of the adjacent vehicle; and
detecting the vacant space on a basis of the positional relationship between the reference vehicle and the adjacent vehicle in a case where it is determined that the reference vehicle and the adjacent vehicle are aligned in an orderly manner.

* * * * *